(12) United States Patent
Schäfer et al.

(10) Patent No.: US 12,459,284 B2
(45) Date of Patent: Nov. 4, 2025

(54) UNPRINTED INKJET-PRINTABLE FILLABLE POUCHES AND METHODS FOR PRODUCING AND PRINTING SAID POUCHES

(71) Applicant: Sihl GmbH, Düren (DE)

(72) Inventors: Manfred Schäfer, Cologne (DE); Steffen Ohr, Sursee (CH); Ronny Kunze, Schenkelberg (DE); Axel Niemöller, Düren (DE)

(73) Assignee: Sihl GmbH, Düren (DE)

( * ) Notice: Subject to any disclaimer, the term of this patent is extended or adjusted under 35 U.S.C. 154(b) by 137 days.

(21) Appl. No.: 18/209,164

(22) Filed: Jun. 13, 2023

(65) Prior Publication Data

US 2023/0399158 A1   Dec. 14, 2023

(30) Foreign Application Priority Data

Jun. 14, 2022 (EP) .................................. 22 179 070

(51) Int. Cl.
*B41M 5/50* (2006.01)
*B41M 5/00* (2006.01)
*B41M 5/52* (2006.01)

(52) U.S. Cl.
CPC .......... *B41M 5/504* (2013.01); *B41M 5/0047* (2013.01); *B41M 5/506* (2013.01); *B41M 5/508* (2013.01); *B41M 5/5218* (2013.01); *B41M 5/5227* (2013.01)

(58) Field of Classification Search
CPC .... B41M 5/504; B41M 5/0047; B41M 5/506; B41M 5/508; B41M 5/5218; B41M 5/5227

USPC .......................................................... 428/32.1
See application file for complete search history.

(56) References Cited

U.S. PATENT DOCUMENTS

| | | | |
|---|---|---|---|
| 5,281,504 A | 1/1994 | Kanbayashi et al. | |
| 5,354,634 A | 10/1994 | Misuda et al. | |
| 8,186,827 B2 | 5/2012 | Kubota et al. | |
| 9,555,655 B2 | 1/2017 | Sugiura et al. | |
| 11,400,744 B2 | 8/2022 | Schäfer et al. | |
| 2008/0008846 A1 | 1/2008 | Zhou et al. | |
| 2012/0225223 A1 | 9/2012 | Takahashi et al. | |

(Continued)

FOREIGN PATENT DOCUMENTS

| | | |
|---|---|---|
| EP | 0501360 A1 | 9/1992 |
| EP | 0507255 A1 | 10/1992 |

(Continued)

*Primary Examiner* — Betelhem Shewareged
(74) *Attorney, Agent, or Firm* — The Webb Law Firm

(57) ABSTRACT

The present invention is directed to an unprinted inkjet-printable fillable pouch made of an unprinted inkjet-printable film including (a) a multilayer polymer film including a base layer (a1) and a sealing layer (a2) which is the inner layer of the pouch and (b) at least one ink-receiving layer as the outer layer deposited on the multilayer polymer film (a) from an aqueous coating composition including (b1) a polymeric binder, (b2) fine inorganic particles, and (b3) coarse inorganic and/or organic particles. Also provided is a method for producing the unprinted pouches on a pouch making machine as well as a method for printing the pouches, preferably in a single pass inkjet printing process. The printed pouch is ideal to be filled with food, pet food, beverages, pharmaceuticals and/or personal care products.

19 Claims, 2 Drawing Sheets

(56) References Cited

U.S. PATENT DOCUMENTS

| | | | |
|---|---|---|---|
| 2018/0223119 A1* | 8/2018 | Oriakhi | B41M 5/0047 |
| 2019/0070821 A1 | 3/2019 | Kohn et al. | |
| 2019/0152209 A1* | 5/2019 | Ikeda | B32B 27/32 |
| 2020/0094535 A1* | 3/2020 | Schäfer | B41M 5/52 |
| 2023/0399158 A1* | 12/2023 | Schäfer | B65B 61/025 |

FOREIGN PATENT DOCUMENTS

| | | |
|---|---|---|
| EP | 0770230 B1 | 8/2000 |
| EP | 2033804 A2 | 3/2009 |
| EP | 3000611 A1 | 3/2016 |
| EP | 3450195 A2 | 3/2019 |
| EP | 3492271 A1 | 6/2019 |
| EP | 3628505 A1 | 4/2020 |
| JP | H11309800 A | 11/1999 |

* cited by examiner

UNPRINTED INKJET-PRINTABLE FILLABLE POUCHES AND METHODS FOR PRODUCING AND PRINTING SAID POUCHES

CROSS-REFERENCE TO RELATED APPLICATION

This application claims priority to European Patent Application No. 22 179 070.2 filed Jun. 14, 2022, the disclosure of which is hereby incorporated by reference in its entirety.

BACKGROUND OF THE INVENTION

Field of the Invention

The present invention relates to an unprinted inkjet-printable fillable pouch prepared from an unprinted inkjet-printable film, a method for producing said pouch, a method for printing said pouch with inkjet-printing and a combined method of producing and printing a fillable pouch.

Description of Related Art

Packaging, such as tubes, pouches or other flexible containers made from printed flexible films are widely used in the packaging sector. In particular, pouches used in the food or pet food sector needs to fulfill specific conditions with regard to sealing ability, stability, and food conformity of the material.

So far, flexible printable films are printed for example with inkjet printing and the printed material is afterwards converted into the desired shape of the packaging such as a pouch. Suitable inkjet-printed flexible films for packaging applications, which can be processed into packaging after printing, are for example disclosed in EP 3 628 505 A1.

However, the inkjet-printed surfaces of the film material are often susceptible to scratches or other damages when folded, stretched, or bent during the pouch production, often requiring varnishing or lamination of the printed surface before pouch production. In the absence of a covering layer, there is also the risk of print transfer from the inkjet-printed surface to the backside of the film material—typically stored in reels—before pouch making. This may be critical as regards food compliance because the backside of the film will become the inside of the pouch. In addition, the customization of print designs for small lot sizes of pouches, which is becoming increasingly popular in the packaging industry, is not easy to achieve if a film material has to be printed before the pouches are formed.

EP 3 492 271 A1 discloses small inkjet printable sachets made of a transparent tearable inkjet recording medium. The sachets are primarily intended to package pharmaceutical products and visibility of the packaged product is essential. The sachets are not produced on a commercial pouch making machine.

However, pouches used in the food or pet food sector to contain larger volumes of products of up to 3 l must be made from a tear-resistant film material to avoid damage to the pouch.

SUMMARY OF THE INVENTION

There is a need for inkjet-printable pouches to be used in the food or pet food sector, which are produced from a flexible material before being printed and which combine good machinability on commercial pouch making and printing machines and high-quality printability with water-based inkjet inks, particularly pigmented inks. In addition, such a concept would be ideal for small lot sizes of pouches, in particular with the increasingly popular flexible and customized print designs. Conformity of the pouch material as contact material for food, pet food, beverages, pharmaceuticals, and personal care products is essential if used accordingly.

This need is met by an unprinted inkjet-printable fillable pouch made of an unprinted inkjet-printable film comprising: (a) a multilayer polymer film comprising a base layer (a1) and a sealing layer (a2) which is the inner layer of the pouch and (b) at least one ink-receiving layer as the outer layer deposited on the multilayer polymer film (a) from an aqueous coating composition comprising: (b1) a polymeric binder, (b2) fine inorganic particles having a median particle size ($Dv_{50}$) of from 50 to 300 nm, and (b3) coarse inorganic and/or organic particles having a median particle size ($Dv_{50}$) of from 5 to 14 µm, wherein the unprinted inkjet-printable film has an average surface roughness Rz of from 3.0 to 12.0 µm.

This need is also met by an unprinted inkjet-printable fillable pouch made of an unprinted inkjet-printable film comprising: (a) a multilayer polymer film comprising a base layer (a1) and a sealing layer (a2) which is the inner layer of the pouch and (b) at least one ink-receiving layer as the outer layer deposited on the multilayer polymer film (a) from an aqueous coating composition comprising: (b1) a polymeric binder, (b2) fine inorganic particles having a median particle size ($Dv_{50}$) of from 50 to 300 nm, and (b3) coarse inorganic and/or organic particles having a median particle size ($Dv_{50}$) of from 5 to 14 µm, wherein the coarse inorganic and/or organic particles have a specific pore volume of from 1.3 to 2.5 ml/g.

This need is also met by an unprinted inkjet-printable fillable pouch made of an unprinted inkjet-printable film comprising: (a) a multilayer polymer film comprising a base layer (a1) and a sealing layer (a2) which is the inner layer of the pouch and (b) at least one ink-receiving layer as the outer layer deposited on the multilayer polymer film (a) from an aqueous coating composition comprising: (b1) a polymeric binder, (b2) fine inorganic particles having a median particle size ($Dv_{50}$) of from 50 to 300 nm, and (b3) coarse inorganic and/or organic particles having a median particle size ($Dv_{50}$) of from 5 to 14 µm, wherein the coarse inorganic and/or organic particles have an oil absorption value of from 220 to 400 g/100 g.

The present invention is also directed to a method for producing unprinted inkjet-printable fillable pouches from the unprinted inkjet-printable film on a pouch making machine, comprising the steps of: (m-1) providing one or more webs of the unprinted inkjet-printable film which are preferably unwound from one or more reels; (m-2) moving the web(s) of the unprinted inkjet-printable film in a longitudinal direction; (m-3) converting the web(s) of the unprinted inkjet-printable film into a pouch precursor web having a desired shape by folding and/or stacking the web(s) with the ink-receiving layer (b) as outer layers of the pouch precursor web and optionally integrating a bottom; (m-4) sealing the pouch precursor web to obtain a web of pouches, (m-5) cutting off the pouches from the web; and (m-6) optionally stacking the pouches.

The present invention is further directed to a method for printing the unprinted inkjet-printable fillable pouch comprising the step of water-based inkjet printing at least one main surface of the pouch.

The method of the present invention of producing an inkjet-printable fillable pouch before the printing process combines the advantages of avoiding damage to the printed surface and printing small lot sizes even with personalized designs with less effort. The pouches prepared from an unprinted inkjet-printable film of the present invention show excellent printability, have pleasant haptic properties which are required for customer satisfaction and enable the feeding of the pouches from stack in the printing process. The method of the present invention wherein the already finished pouch is printed further reduces waste of already printed material and prevents the risk of print transfer to the backside of the film material, which is particularly important for packaging of food, pet-food or beverages.

DESCRIPTION OF THE INVENTION

Figure 1:
FIG. 1 shows an unprinted inkjet-printable fillable stand-up pouch according to the invention on the left and the printed, over-varnished and filled inventive stand-up pouch on the right.

As used herein, the term "unprinted inkjet-printable film" refers to a film which is not printed in any way so far and is capable of receiving an ink. The unprinted inkjet-printable film comprises a multilayer polymer film (a) comprising a base layer (a1) and a sealing layer (a2) below the base layer (a1). Throughout this application the term "layer" is used to encompass both the layers of a coextruded polymer film and the layers of a polymer laminate which can also be referred to as "films". The multilayer polymer film (a) can be a coextruded polymer film or a laminated polymer film. As used herein, the term "laminated polymer film" includes laminates of polymeric films and laminates of polymeric and one or more non-polymeric films. One or more of the single polymeric films of the laminate can also be a multilayer coextruded polymeric film. The single layers of the laminated polymer film can be laminated to each other by the use of heat, pressure, and/or adhesive.

The multilayer polymer film (a) can be translucent or opaque, preferably it is white opaque. The multilayer polymer film (a) typically has a thickness of from 35 to 300 µm, preferably from 50 to 140 µm, more preferably from 60 to 120 µm, and most preferably from 70 to 100 µm The multilayer polymer film (a) comprises a base layer (a1). The base layer (a1) can be any polymeric material that can be processed to a film. The base layer (a1) may also consist of two or more coextruded sublayers.

The base layer (a1) may be a non-sealable polymer layer (a1i). The non-sealable polymer layer (a1i) may be a biaxially oriented polymer film (a1i-1), which typically comprises a thermoplastic material. Useful thermoplastic materials are selected from polyesters, polyolefins, polystyrenes, polyamides, and blends and copolymers thereof. Preferably the thermoplastic material is selected from poly(ethylene terephthalate)s (PET), poly(ethylene naphthalate)s, polylactides (also referred to "poly(lactic acid)"—PLA), polypropylenes (PP), polyamides, and blends and copolymers thereof. The most preferred biaxially oriented polymer films (a1i-1) are biaxially oriented polypropylenes (BOPP) such as BOPP films available from Innovia Films under the tradename Rayoface®, and biaxially oriented poly(ethylene terephthalate)s (BOPET) such as BOPET films available from Mitsubishi Polyester Film GmbH under the tradename Hostaphan®, from DuPont under the tradenames Mylar® and Melinex®, and from Polyplex Corporation Ltd./Transparent Paper Ltd. under the tradename Sarafil®. The biaxially oriented polymer film (a1i-1) can be transparent, translucent or opaque, e.g., white opaque. Suitable films can be foamed, cavitated, or dyed in the mass, e.g., with a white pigment. The surface(s) of biaxially oriented polymer film can be treated, e.g., by corona treatment, flame treatment, or chemical treatment. The treatment of the surface can have various effects such as an improvement of wettability and adhesion to the adjacent ink-receiving layer, especially in the case of BOPP films, and thus in an increase of composite strength.

The non-sealable polymer layer (a1i) may also be a non-oriented polymer layer (a1i-2), preferably a regenerated cellulose layer or a cellulose acetate layer. The cellulose acetate layer may be a layer of cellulose monoacetate, diacetate or triacetate or any combination thereof.

As used herein, the term "regenerated cellulose" refers to a class of well-known polymers formed by precipitation of cellulose from its solution, such as from wood, cotton, hemp or other sources. Regenerated cellulose may be prepared by viscose process including first derivatizing cellulose with carbon disulfide and sodium hydroxide to an alkali-soluble sodium cellulose xanthan, commonly known as viscose, which is further dissolved in dilute sodium hydroxide.

The viscose liquid is extruded into a bath of sulfuric acid and sodium sulfate to reconvert it to solid cellulose resulting regenerated cellulose after completion of the viscose process, which is called cellophane, when the regenerated cellulose is in film form. Suitable examples of regenerated cellulose films include NatureFlex™ films, such as NatureFlex™ NK White, NatureFlex™ NKM, NatureFlex™ NVS White, NatureFlex™ XS, and Cellophane™ films, such as Cellophane™ WSBZ and Cellophane™ XS, all available from Futamura Group (Great Britain).

The thickness of the base layer (a1) is typically within the range of from 8 to 80 µm, preferably from 12 to 60 µm.

The multilayer polymer film (a) according to the present invention further comprises a sealing layer (a2), which is the inner layer of the pouch. As used herein, the term "inner layer" refers to the layer of the polymer film which is the final layer of the polymer film on the inside of the pouch. As used herein, the term "sealing layer" refers to a layer composed of a material that due to its nature can be joined with a similar or dissimilar material using sealing methods such as heat-sealing, i.e., a temperature above room temperature (23° C.), or ultrasonic sealing, and optionally also pressure. The sealing layer (a2) of the present invention can typically be sealed by a heat-sealing or an ultrasonic sealing process. Preferably, the sealing layer (a2) is heat-sealable, i.e., sealable at a temperature above room temperature (23° C.). In particular, the sealing layer (a2) is sealable at a temperature being in the range of from 70 to 200° C., preferably from 80 to 170° C.

The sealing layer (a2) can be constructed from one single polymer or a blend or other combination of polymers, e.g. in the form of different polymer sublayers. The sealing layer (a2) may comprise a not biaxially oriented polyamide (PA); a polyethylene polymer (PE), such as high density polyethylene (HDPE), low density polyethylene (LDPE), linear low density polyethylene (LLDPE), ultra linear low density polyethylene (ULLDPE), metallocene based LLDPE (mLLDPE); a polyethylene copolymer, such as ethylene (meth) acrylic acid copolymer (EAA), ethylene methyl acrylate (EMA), ethylene-vinyl acetate copolymer (EVA), ethylene butyl acrylate (EBA); a polypropylene, such as cast polypropylene (cPP); a polypropylene copolymer (including terpolymers), such as a propylene/ethylene copolymer; (co)polyesters, such as amorphous poly(ethylene terephthalate) (APET), not biaxially oriented glycol-modified poly(ethylene terephthalate) (PET-G); or not biaxially oriented polylactides (PLA), e.g. cast polylactide (cPLA); poly(vinylidene chloride); poly(vinylchloride); poly(vinyl acetate); a poly(meth)acrylate; or any copolymer, blend or other combination thereof. The sealing layer (a2) can be a coextruded polymer film such as a coextruded polypropylene/polypropylene copolymer film or a coextruded polyethylen/polyethylene copolymer film, such as a cast or blown coextruded polypropylene/polypropylene copolymer film or a cast or blown coextruded polyethylen/polyethylene copolymer film, preferably a cast or blown coextruded polyethylene/polyethylene copolymer film.

The base layer (a1) and the sealing layer (a2) may be a monomaterial. As used herein, the term "monomaterial" means that both layers (a1) and (a2) are completely or substantially composed of a single type of polymer. Herein, "substantially composed of a single type of polymer" means that at least 70 wt. %, such as at least 80 wt. %, such as at least 90 wt. % of the polymers of the material are the same type of polymer. Typical monomaterials that can be used in the present invention are polypropylene or poly(ethylene terephthalate) monomaterials. For example, the base layer (a1) is a BOPP film and the sealing layer (a2) is a cPP film, or the base layer (a1) is a BOPP film and the sealing layer (a2) is a cast coextruded polypropylene/polypropylene copolymer film, or the base layer (a1) is a BOPET film and the sealing layer (a2) is an APET or PET-G film.

The sealing layer (c) may have a thickness of from 8 to 120 μm. In case the multilayer polymer film (a) is a laminated polymer film, the sealing layer (a2) preferably has a thickness of from 25 to 120 μm, more preferably from 30 to 90 μm. In case the multilayer polymer film (a) is a coextruded polymer film, the sealing layer (a2) preferably has a thickness of from 8 to 25 μm.

The multilayer polymer film (a) of the present invention may further comprise at least one intermediate layer (a3). The intermediate layer (a3) may be located on top or below the base layer (a1) or on both sides of the base layer (a1). The intermediate layer (a3) can have various effects. The thickness of the intermediate layer (a3) can range of from 10 nm to 10 μm.

Typically, the intermediate layer (a3) is an adhesion promoting layer or a tie layer. An adhesion promoting layer improves the wettability of the base layer (a1) and its adhesion to the adjacent ink-receiving layer (b) or any other adjacent layer and thus results in an increase of composite strength. An adhesion promoting layer on top of the base layer (a1) and adjacent to the ink-receiving layer (b) may be subjected to a corona treatment. The adhesion promoting layer, preferably positioned between the base layer (a1) and the ink-receiving layer (b), may comprise a polymer selected from poly(meth)acrylates, copolymers comprising units derived from (meth)acrylates, poly(vinyl acetate)s, polyurethanes, polypropylene copolymers, such as polypropylene terpolymers, and blends of these polymers. Biaxially oriented polymer films (a1i-1), such as BOPP or BOPET films, already coated with an adhesion promoting layer are commercially available, e.g., Hostaphan® RNK 2CSR from Mitsubishi Polyester Film GmbH or coated Sarafil® films available from Polyplex Corporation Ltd./Transparent Paper Ltd., such as Sarafil® S42 and Sarafil® TW102. An intermediate layer (a3) whose purpose is to bond neighboring layers of limited compatibility in a coextruded film is also referred to as a tie layer. The unprinted inkjet-printable film according to the present invention may further comprise a barrier layer (a4). The barrier layer (a4) can be located between the base layer (a1) and the sealing layer (a2) or between two base layers (a1). The barrier layer (a4) may be a metal or metal oxide, a metal or metal oxide coated polymeric carrier film, a metal foil or a polymer film having barrier properties. The metal oxide coated polymeric carrier films are preferably $AlO_x$ or $SiO_x$ coated polymeric carrier films, such as $AlO_x$ or $SiO_x$ coated PP, PET, or PLA films. Typically, the barrier layer (a4) is a polymer film comprising an ethylene/vinyl alcohol copolymer (EVOH) or a polyamide (co) polymer, an aluminum foil or a copper foil; preferably the barrier layer is an aluminum foil. The barrier layer (a4) may have a thickness of from 6 to 30 μm, preferably from 7 to 25 μm. More preferably, the barrier layer is an aluminum foil having a thickness of from 7 to 15 μm.

The base layer (a1) may also consist of coextruded sublayers comprising two core layers (a11) and a central barrier layer (a4), and optionally intervening tie layers (a3).

In case the multilayer polymer film (a) is a laminated polymer film, the layers (a1) to (a4) can be laminated to each other by any laminating process using conventional laminating adhesives, such as dry lamination with either aqueous (water-based) or solvent-based adhesives; solvent-free lamination with 1-component or 2-component adhesive systems; hot-melt lamination with hot-melt adhesives or extrusion glues, e.g. on the basis of polyolefins, and lamination with radiation-curable adhesives. Preferred adhesives are water-based or solvent-free adhesives on the basis of polymers or prepolymers such as poly(meth)acrylates and polyurethanes. The adhesive may contain additional components such as crosslinking agents, plasticizers, tackifiers, and colorants. The type of adhesive, including type and amount of additives, used for lamination depends on the intended use of the multilayer laminate. In case of use as a food packaging material the relevant legal regulations for food must be observed. The adhesive is typically applied in an amount of from 0.5 g/m² to 10 g/m², preferably from 1 g/m² bis 6 g/m².

An example of an inventive multilayer polymer film (a) being a coextruded polymer film is a symmetric blown film and more preferably a symmetric blown film of a polypropylene monomaterial. As used herein, the term "symmetric film" refers to a film in which the layers are arranged symmetrically. A typical layer sequence of a symmetric blown film is: an adhesion promoting layer (a3) being sealable/a base layer (a1) (consisting of a first core layer (a11)/a barrier layer (a4)/a second core layer (a1))/a sealing layer (a2) being the same material as the adhesion promoting layer (a3) with optional tie layers (a3) between the core layers (a11) and the barrier layer (a4). A suitable symmetric blown film is exemplified below. A simultaneous biaxial orientation of the blown film can be achieved by the double or triple bubble coextrusion process.

According to the present invention the unprinted inkjet-printable film comprises at least one ink-receiving layer (b). If the film comprises more than one ink-receiving layers at least the outer layer has the features and properties described herein for the ink-receiving layer (b). As used herein, the term "ink-receiving layer" refers to a coating provided over the multilayer polymer film (a) as an outer layer of the unprinted inkjet-printable film, which is capable of receiving an ink. As used herein, the term "outer layer" refers to the top layer of the polymer film and to the outside of the unprinted inkjet-printable fillable pouch. The ink-receiving layer (b) is coated over the multilayer polymer film (a), typically over the base layer (a1) or any optional intermediate layer (a3), wherein the dry coating weight of the ink-receiving layer may be in the range of from 10 to 27 g/m², preferably from 15 to 25 g/m², and more preferably from 18 to 24 g/m².

The at least one ink-receiving layer (b) is deposited from an aqueous coating composition comprising a binder (b1), fine inorganic particles (b2) having a median particle size ($Dv_{50}$) of from 50 to 300 nm, and coarse inorganic and/or organic particles (b3) having a median particle size ($Dv_{50}$) of from 5 to 14 µm. Unless otherwise stated, the median particle size ($Dv_{50}$) of both the fine and coarse particles is determined herein by laser diffraction according to ISO 13320:2020-01, for example on a LS 13320 device from Beckman Coulter. As used herein, the median particle size refers to the size of the particles as they exist in the aqueous coating composition, i.e., the median particle size ($Dv_{50}$) as used herein means the median size ($Dv_{50}$) of the dispersed particles.

As the polymeric binder (b1) according to the present invention any polymeric binder known for use in preparing ink-receiving layers (b) can be used. Typically, the polymeric binder (b1) is a water-soluble polymeric binder.

The polymeric binder may comprise poly(vinyl alcohol); poly(vinyl alcohol) derivatives; poly(ethylene oxide); poly(vinylmethylether); cellulose derivatives, such as methylcellulose, ethylcellulose, and carboxymethylcellulose; polyvinylpyrrolidone, or any combination thereof. Preferably, the polymeric binder (b1) comprises poly(vinyl alcohol), poly(vinyl alcohol) derivatives or any combination thereof. Poly(vinyl alcohol) or a derivative thereof may be used as the sole polymeric binder (b1) in the ink-receiving layer (b), i.e. no other polymer is present in the ink-receiving layer (b) apart from any optional polymeric particles as described below.

The term "poly(vinyl alcohol)" is generally acknowledged in the art as a completely or partially hydrolyzed polyvinyl acetate. The degree of hydrolysis attributed to a poly(vinyl alcohol) designates the degree of hydrolysis of the poly(vinyl acetate) in accordance with standard practice. The degree of hydrolysis is from 80 to 99 mol %, preferably from 86 to 98 mol %. The degree of hydrolysis (saponification) H indicates what percentage of the basic poly(vinyl acetate) molecules is "saponified" to poly(vinyl alcohol). From the residual acetyl group content and thus the ester value EV, H is calculated by using the following formula:

$$H \text{ in mol \%} = \frac{100 - 0.1535 \cdot EV}{100 - 0.0749 \cdot EV} \cdot 100$$

A degree of hydrolysis of 100% means, therefore, that the poly(vinyl alcohol) has no acetyl groups. The term "ester value" (EV) connotes the number of mg KOH needed to neutralize the acid released from the ester by saponification in 1 g of substance. It is determined in analogy to DIN 53401 as follows: Approximately 1 g of poly(vinyl alcohol) is weighed into a 250-ml round-bottomed flask and mixed with 70 ml distilled water and 30 ml neutralized alcohol, then heated with reflux until it dissolves. After cooling it is neutralized against phenol phthalein with 0.1 n KOH. When neutralization is complete, 50 ml 0.1 n KOH are added and the mixture is boiled for 1 hour with reflux. The excess caustic solution is back-titrated in the heat with 0.1 n HCl against phenolphthalein as indicator until the coloration fails to recur. A blank test is carried out at the same time.

$$\text{Ester value } (EV) = \frac{(a - b) \cdot 5.61}{E}$$

a=consumption of ml 0.1 n KOH
b=consumption of ml 0.1 n KOH in the blank test
E=weighed quantity of poly(vinyl alcohol) (dry)

The degree of hydrolysis of the poly(vinyl alcohol) has to be understood as an average value, meaning that mixtures of less hydrolyzed and more hydrolyzed poly(vinyl alcohol)s can be used as well. Typically, the weight average molecular weight of the poly(vinyl alcohol) is at least 100.000 g/mol, more preferably at least 120.000 g/mol, and most preferably at least 150.000 g/mol, as determined by gel permeation chromatography using polystyrene standards combined with static light scattering (absolute method) on re-acetylized specimen. Re-acetylization is performed by standard methods known in the art, e.g., in a pyridine/acetic anhydride mixture. Suitable examples of poly(vinyl alcohol) include, but are not limited to, Poval™ grades, e.g. Poval™ 40-88, Poval™ 56-88, Poval™ 25-98 R, Poval™ 26-88, Poval™ 30-92, and Moviol® grades, e.g. Mowiol® 40-88, available from Kuraray.

The aqueous coating composition from which the ink-receiving layer (b) is deposited may comprise a crosslinking agent (b4). Suitable crosslinking agents for use in the present invention include boric acid, borate, dialdehydes such as glyoxal, glyoxylic acid, salts of glyoxylic acid such as sodium or calcium salts, dihydrazides such as adipic acid dihydrazide, di- or polyols such as methylolmelamine, urea glyoxyl resin or urea glyoxal resins, compounds having silanol groups and any combinations thereof.

In case poly(vinyl alcohol) is used as the polymeric binder (b1), preferred crosslinking agents (b4) comprise boric acid and/or borate. The ink-receiving layer (b) may comprise boron in an amount of >0 and less than 60 mg/m², preferably less than 40 mg/m², more preferably less than 30 mg/m², and most preferably less than 20 mg/m² in the dry coating. The ink-receiving layer (b) may be prepared according to the method described in EP 3 628 505 A1.

The aqueous coating composition from which the ink-receiving layer (b) is deposited further comprises fine inorganic particles (b2) having a median particle size ($Dv_{50}$) of from 50 to 300 nm, preferably 65 to 200 nm, more preferably from 80 nm to 180 nm. The particles size distribution is preferably unimodal. The fine inorganic particles (b2) are aggregates of primary particles which are dispersed in the aqueous coating composition, i.e., the median particle size ($Dv_{50}$) as used herein with respect to the fine inorganic particles (b2) means the median primary aggregate size ($Dv_{50}$).

The fine inorganic particles (b2) can comprise any inorganic particle suitable and/or commonly used in ink-receiving coatings, in particular in coatings provided to be printed by inkjet prints with aqueous inkjet inks. Preferably, the fine inorganic particles (b2) provide a high porous microporous ink-receiving layer.

With "high porous" or "high porosity" is meant that the ink-receiving layer has a porosity (pore volume) of from 0.2 to 2.0 ml/g. The porosity of the ink-receiving layer (b) is determined by contacting the ink-receiving layer (b) of the unprinted film sample with 1-methoxy-2-propanol in order to fill the pores of the ink-receiving layer (b) with the liquid and calculating the pore volume from the weight difference of the dry coating and the 1-methoxy-2-propanol saturated coating after removing excess liquid from the surfaces using a density of 0.92 g/cm$^3$ for 1-methoxy-2-propanol. The porosity in ml/g can be determined according to the following definition: porosity of the layer=liquid uptake into the pore volume in ml/m$^2$/coating weight of the microporous layer in g/m$^2$.

With "microporous" is meant that the pores between the particles, within particle aggregates and/or the particles and the binder have a pore size (diameter) in the range of from 2 nm to less than 0.5 µm, preferably in range of from 5 nm to less than 0.2 µm, even more preferred in the range from 10 nm to 100 nm as can be measured by mercury intrusion porosimetry.

The fine inorganic particles (b2) according to the present invention may have a BET surface area of from 100 to 400 m$^2$/g. Unless otherwise stated, the BET surface area is determined herein by gas adsorption according to ISO 9277:2010. Typically, the weight ratio of fine inorganic particles (b2) to binder (b1) is within the range of from 3:1 to 25:1. The exact weight ratio of (b2) to (b1) in the aqueous coating composition and thus in the respective ink-receiving layer (b) is selected based on the type of fine inorganic particles.

Preferred fine inorganic particles (b2) for preparing the ink-receiving layer (b) comprise alumina, such as fumed alumina; aluminum oxide hydroxide, such as boehmite and pseudoboehmite; aluminum hydroxide; cationically surface-modified silica, such as cationically surface-modified fumed silica and cationically surface-modified colloidal silica obtained by a wet chemical process, and any combinations thereof. The fine inorganic particles (b2) are more preferably selected from boehmite, cationically surface-modified fumed silica, fumed alumina, and combinations thereof, even more preferably from boehmite and cationically surface-modified fumed silica, and combinations thereof. Most preferably the fine inorganic particles (b2) are boehmite particles.

Boehmite is a mineral of aluminum with an orthorhombic unit cell (a=3.693 Å, b=12.221 Å, and c=2.865 Å), classified as aluminum oxide hydroxide ($\gamma$-AlO(OH) (=Al$_2$O$_3$·H$_2$O)). Its crystal structure consists of double layers of oxygen octahedrons with a central aluminum atom. The outfacing oxygen is bonded via hydrogen bonds to the hydroxyl group of the adjacent layer of octahedrons. Due to the weak bonds, boehmite is prone to intercalation, that is, the inclusion of small molecules, usually water, in between these layers. This causes a larger spacing in [010] direction and a perfect cleavage perpendicular to the general direction of the hydrogen bonding. Boehmite with an increased spacing in the [010] direction is referred to as pseudoboehmite and amorphous boehmite is usually referred to as gel. Pseudoboehmite is characterized by a higher water content (Al$_2$O$_3$·x H$_2$O (1.0<x<2.0). Boehmite can be found in nature or precipitated and grown from solution of aluminum salts and alumina under hydrothermal conditions. Boehmite particles within the meaning of the present invention are small primary aggregates of boehmite crystallites (primary particles).

Favorably, the boehmite crystallites are not needle-shaped, preferably they are tabular and more preferably have an average aspect ratio of 3.0 or more and 10 or less and a tabular surface with a major axis-to-horizontal ratio of 0.60 or more and 1.0 or less. The aspect ratio can be determined by a method disclosed in Japanese Patent Publication No. 5-16015. The aspect ratio is herein expressed as the ratio of the diameter to the thickness of a particle. The term "diameter" as used herein refers to the diameter of a circle having the same area as the projected area of a particle of the alumina hydrate as observed with a microscope or an electron microscope (equivalent circle diameter). The major axis-to-minor axis ratio of the tabular surface is defined as the ratio of the minimum diameter to maximum diameter of the tabular surface as observed with a microscope in the same manner as described for the aspect ratio.

The small primary aggregates of boehmite crystallites can be obtained by dispersion of secondary larger agglomerates of boehmite crystallites having a mean particle size in the range of from 1 µm to 100 µm present in commercially available boehmite powders, e.g., as delivered from a spray drying process. The primary aggregates may have a porous structure. The boehmite particles may have specific pore volume of from 0.5 to 1.5 ml/g, preferably from 0.8 to 1.3 ml/g. Unless otherwise stated, the specific pore volume is determined herein by means of nitrogen sorption according to the methods of Barrett, Joyner and Halenda (BJH) and Gurwitsch as described in DIN 66134:1998-02.

The boehmite particles may have a BET specific surface area of from 100 to 200 m$^2$/g, preferably from 120 to 180 m$^2$/g. The specific pore volume and the BET specific surface area are determined on the powder after calcination at 550° C. for 3 h.

Suitable commercially available boehmite powders to be used as fine inorganic particles (b2) in the ink-receiving layer (b) include DISPERAL® and DISPAL® grades available from Sasol, e.g., HP8, HP10, HP14, and HP18, preferably HP14.

When boehmite particles are used as the fine inorganic particles (b2), the weight ratio of boehmite particles to binder (b1) may be within the range of from 7:1 to 25:1, preferably from 7.5:1 to 20:1, and more preferably from 8:1 to 12:1. Moreover, the ink-receiving layer (b) may have a porosity of from 0.3 to 1.5 ml/g, preferably from 0.35 to 1.2 ml/g, more preferably from 0.4 to 1.0 ml/g, most preferably from 0.5 to 0.8 ml/g measured as described above.

When boehmite particles are used as the fine inorganic particles (b2), the aqueous coating composition from which the ink receiving layer (b) is deposited may comprise (b5) an acidic dispersing agent, preferably being an organic and/or inorganic acid having a pk$_a$ value lower than 5.0; more preferably an inorganic or organic acid having a pk$_a$ value of less than 2.0, such as HCl, HBr, HNO$_3$, formic acid, acetic acid, propionic acid lactic acid, and sulfamic acid, and any combinations thereof. The acidic dispersing agent (b5) may be used in an amount of from more than 0 to 10 wt. %, preferably from 1 to 5 wt. %, each based on the amount of the fine inorganic particles (b2).

The fine inorganic particles (b2) may further comprise cationically surface-modified silica particles. Typically, the cationically surface-modified silica particles are cationically surface-modified fumed silica particles derived from fumed silica particles, such as Aerosil® 200, Aerosil®255, Aerosil® 300 from Evonik, Cab-o-Sil® M-3, Cab-o-Sil® M-5 from Cabot and HDK® grades from Wacker. Suitable fumed silica particles may have a BET specific surface area in the range of from 100 m$^2$/g to 400 m$^2$/g, preferably from 200 m$^2$/g to 300 m$^2$/g. Furthermore, the fine inorganic particles (b2) may be cationically surface-modified colloidal silica obtained by a wet chemical process such as derived from colloidal silica commercially available under the tradename Snowtex® from Nissan Chemical Ind., Ltd.

The surface of the silica particles has been rendered cationic by modification with a cationizing agent in order to improve dispersibility of the particles in the aqueous coating composition. The cationization agent is typically selected from aluminum salts, e.g., aluminumhydroxid chloride; cationic polymers, e.g. PDADMAC, polyvinylamin; and aminosilanes, e.g. 3-aminopropyltriethoxysilane, 3-aminopropyltrimethoxysilan, N-2-aminoethyl-3-aminopropyltrimethoxysilane, and n-butyl aminopropyl trimethoxysilane.

When cationically surface-modified silica particles are used as the fine inorganic particles (b2), the weight ratio of silica particles to binder (b1) may be within the range of from 3:1 to 15:1.

Moreover, when the fine inorganic particles are cationically surface-modified silica particles, the ink-receiving layer (b) may have a porosity of from 0.5 to 2.0 ml/g measured as described above.

The fine inorganic particles (b2) may also be alumina particles, preferably fumed alumina particles, such as fumed alumina particles like Alu-oxide C® from Evonik, or fumed alumina particles originating from Aerodisp® W type dispersions based on fumed alumina from Evonik, such as Aerodisp® W 925, Aerodisp® W 630, Aerodisp® W 440. Suitable fumed alumina particles may have a high BET specific surface area in the range of from of from 50 $m^2/g$ to 150 $m^2/g$, preferably from 85 $m^2/g$ to 115 $m^2/g$. The weight ratio of alumina particles to binder (b1) may be within the range of from 10:1 to 20:1. When alumina particles are used as fine inorganic particles (b2) for preparing the ink-receiving layer (b), the porosity of the layer (b) may be of from 0.2 to 1.2 ml/g measured as described above.

Moreover, mixtures of the above mentioned fine inorganic particles can be used as the fine inorganic particles (b2) for preparing the ink-receiving layer (b).

The aqueous coating composition from which the ink-receiving layer (b) is deposited further comprises coarse inorganic and/or organic particles (b3) having a median particle size ($Dv_{50}$) of from 5 to 14 μm, preferably from 6 to 13 μm, more preferably from 7 to 12 μm. The coarse particles (b3) as used in the present application may be inorganic particles, organic particles or a combination of both.

The coarse particles (b3) used in the present invention may have a specific pore volume of from 1.3 to 2.5 ml/g, preferably from 1.5 to 2.3 ml/g, more preferably from 1.7 to 2.1 ml/g. The coarse inorganic and/or organic particles (b3) used in the present application may further have an oil absorption value of from 220 to 400 g/100 g, preferably from 230 to 380 g/100 g, more preferably from 240 to 360 g/100 g. Unless otherwise stated, the oil absorption value is herein determined according to DIN EN ISO 787-5:1995-10.

Typically, the coarse particles (b3) are selected from inorganic particles comprising aluminum oxides; aluminum oxide hydroxides, such as boehmite or pseudoboehmite; silica, such as precipitated silica and gel type silica; and any combinations thereof and organic particles comprising polymeric particles such as particles comprising a polymer selected from polymers and copolymers of ethylene, propylene, styrene, tetrafluoroethylene, and (meth)acrylates, such as poly(methylmethyacrylate) and styrene/methylmethacrylate copolymer, polyamides, polyesters, polymethyl ureas, and starch, such as rice or corn starch, and any combinations thereof. The coarse particles may be any combination of the forgoing inorganic or organic particles. Typically, the coarse particles (b3) are spherical particles.

Suitable examples of polymeric particles used as coarse organic particles (b3) include, but are not limited to, polyamide powders/polymers and copolymers prepared by polymerising laurolactam (PA12) and/or caprolactam (PA6) commercially available under the trademark Orgasol® from Arkema (France), polymethyl urea polymers exemplified by Pergopak® M2 commercially available from Ablemarle Corporation or Deuteron PMH C from Deuteron GmbH.

The coarse particles (b3) are preferably inorganic particles selected from aluminum oxides; aluminum oxide hydroxides, such as boehmite or pseudoboehmite; silica, such as precipitated silica and gel-type silica; and any combinations thereof; more preferably silica particles and most preferably the coarse particles (b3) are gel-type silica particles. Gel-type silicas are also referred to as amorphous silicas and gel-type silica particles can be obtained by milling dried silica gel having a quasi endless sponge structure to the desired particle size. Examples that can be used in the present invention include Gasil® HP type particles, such as Gasil® HP 39, Gasil® HP 255, Gasil® HP 270, Gasil® HP 280 commercially available at PQ Corporation, and Silcron® G-100 commercially available at Millenium Chemicals.

The most preferred coarse particles (b3) according to the present invention are gel-type silica particles having a specific pore volume of from 1.3 to 2.5 ml/g, preferably from 1.5 to 2.3 ml/g, more preferably from 1.7 to 2.1 ml/g, and/or an oil absorption value of from 220 to 400 g/100 g, preferably from 230 to 380 g/100 g, more preferably from 240 to 360 g/100 g.

According to the present invention, the coarse particles (b3) may be comprised in the ink-receiving layer (b) in a maximum amount of 20 wt. %, preferably in an amount of from 2 to 5 wt. %, based on the total dry weight of the ink-receiving layer (b).

The presence of the coarse particles (b3) in the ink-receiving layer (b) of the present invention results a in surface with specific properties which are advantageous in the pouch production process, the following inkjet printing process as well as in the final application of the pouch. In case of a transparent multilayer polymer film, the coarse particles (b3) add haze to the pouch so that the goods may be hardly visible. The coarse particles (b3) also lead to a structured, relatively rough surface having medium gloss. The resulting printed and unprinted surface has excellent haptic properties, i.e. a non-sticky fell, and a pleasant look. The dynamic coefficient of friction of the ink-receiving layer (b) which has been shown to be one important parameter for feeding the material in the pouch production and inkjet printing process can be easily adjusted by selecting the type and amount of coarse particles (b3) in the ink-receiving layer (b).

In order to prepare the aqueous coating composition for forming the ink-receiving layer (b) the components are typically mixed by conventional lacquer manufacturing means. Preferably, the fine inorganic particles (b2) and the coarse particles (b3) are dispersed in cold or hot water by means of strong agitation or high shear mixing devices, e.g. with rotor-stator principle, optionally in the presence of a dispersing agent. This leads to a dispersion with the required particle size for a homogeneous coating. Typically, the polymeric binder (b1), such as poly(vinyl alcohol), is separately dissolved in water and heated for full dissolution to temperatures of from 70° C. to 100° C. The particle dispersion and binder solution are mixed together in order to obtain an aqueous coating composition. The optional crosslinker can be added at any stage of the preparation process. Typically, the aqueous coating composition has a solids content of from 10 to 40 weight %, preferably from 20 to 35 weight %. A typical pH value is within the range of from 2 to 6, preferably from 3 to 5.

The aqueous coating composition can be coated onto the multilayer polymer film by any conventional coating method known in the art. For example, the aqueous coating composition can be applied by means of a curtain coater, a die coater, a roll coater, an air coater, a knife coater, a blade coater, a rod coater, a bar coater, or a comma coater. Application by a curtain coater, such as a curtain coater having one or multiple dies, with coating speeds of e.g. 100 to 200 m/min is preferred. Afterwards, the coating is typically dried at a temperature of from 30° C. to 130° C. for example in air impingement drying ovens.

In case the multilayer polymer film is a laminated polymer film, the aqueous coating composition is typically applied to the base layer (a1) or an optional intermediate layer (a3) to form the ink-receiving layer before the layers are laminated to further layers to prepare the laminated multilayer polymer film.

The unprinted inkjet-printable film according to the present invention may have an average surface roughness Rz of from 3.0 to 12.0 µm, preferably from 4.0 to 10.0, as determined on the surface of the ink-receiving layer (b) according to DIN EN ISO 4287:2010-07 with a sampling length ln of 4.0 mm and a single sampling length lr of 0.8 mm as defined in DIN EN ISO 4288:1998-04 with a 2 µm probe tip and an aperiodic profile setting, for example on a MarSurf PS 10 available from Mahr GmbH, Gottingen, Germany.

Typically, the unprinted inkjet-printable film further has an arithmetic average roughness Ra of from 0.5 to 2.0 µm, also determined as described above for the average surface roughness Rz.

The unprinted inkjet-printable film may exhibit a dynamic coefficient of friction (CoF) of the surface of the ink-receiving layer (b) to itself (film to film) in a range of from 0.30 to 0.50. Unless otherwise stated, the coefficient of friction is herein determined on the surface of the ink-receiving layer (b) according to ISO 8295:1995 but with a 1 kg weight at 300 mm/min drawing speed.

Typically, the ink-receiving layer (b) is a non-transparent layer. When the multilayer film is a transparent film having a haze value of no more than 5%, the unprinted inkjet-printable film preferable has a haze value of more than 25%, more preferably at least 30% and most preferably at least 40% as determined according to ASTM D1003, Procedure A.

It is further preferred that the unprinted inkjet-printable film has a gloss of from 10 to 30 gloss units as determined on the surface of ink-receiving layer (b) at 60°. Unless otherwise stated, the gloss is herein determined according to ISO 2813:2014.

The unprinted inkjet-printable film may have a tear resistance of at least 1 N in machine direction (MD) and cross direction (CD), preferably at least 1.5 N in MD and at least 2.0 N, more preferably at least 4.0 N in CD. Unless otherwise stated, the tear resistance is herein determined according to ISO 6383-1:2015-12.

The ink receptive layer (b) can be in direct contact with the multilayer polymer film (a), or there might be further layers applied between the ink receptive layer (b) and multilayer polymer film (a).

It is understood that the above-mentioned additional layers can be present in any feasible combination and sequence with the proviso that the ink-receiving layer (b) is the outer layer and the sealing layer (a2) is the inner layer of the pouch. Moreover, the inkjet-printable film according to the present invention may comprise further layers which are not specifically discussed herein. Non-limiting exemplary sequences of layers of the unprinted inkjet-printable film include:

BOPET (a1)/PE (a2) Laminate:

| layers | thickness/coating weight |
| --- | --- |
| ink-receiving layer (b) | 22 g/m$^2$ |
| optionally: adhesion promoting layer (a3) | 0.1 g/m$^2$ |
| BOPET film (a1i-1) (white or transparent) | 23 µm |
| optionally: adhesion promoting layer (a3) | 0.1 g/m$^2$ |
| laminating adhesive | 3 g/m$^2$ |
| aluminum foil (a4) | 7-9 µm |
| laminating adhesive | 3 g/m$^2$ |
| LLDPE sealing film (a2) | 60 µm |

BOPP (a1)/PE (a2) Laminate:

| layers | thickness/coating weight |
| --- | --- |
| ink-receiving layer (b) | 22 g/m$^2$ |
| optionally: adhesion promoting layer (a3) | 0.1 g/m$^2$ |
| BOPP film (a1i-1) (white or transparent) | 50 µm |
| optionally: adhesion promoting layer (a3) | 0.1 g/m$^2$ |
| laminating adhesive | 3 g/m$^2$ |
| aluminum foil | 7-9 µm |
| laminating adhesive | 3 g/m$^2$ |
| LLDPE sealing film (a2) | 60 µm |

BOPET (a1)/cPP (a2) Laminate:

| layers | thickness/coating weight |
| --- | --- |
| ink-receiving layer (b) | 22 g/m$^2$ |
| optionally: adhesion promoting layer (a3) | 0.1 g/m$^2$ |
| BOPET film (a1i-1) (white or transparent) | 23 µm |
| optionally: adhesion promoting layer (a3) | 0.1 g/m$^2$ |
| laminating adhesive | 3 g/m$^2$ |
| aluminum foil | 7-9 µm |
| laminating adhesive | 3 g/m$^2$ |
| cPP sealing film (a2) | 30-60 µm |

BOPET (a1)/cPP (a2) Laminate: (Monomaterial for Option B)

| layers | thickness/coating weight |
| --- | --- |
| ink-receiving layer (b) | 22 g/m$^2$ |
| optionally: adhesion promoting layer (a3) | 0.1 g/m$^2$ |
| BOPP film (white or transparent) (a1i-1) | 50 µm |
| optionally: adhesion promoting layer (a3) | 0.1 g/m$^2$ |
| laminating adhesive | 3 g/m$^2$ |
| option A: aluminum foil (a4) or | 7-9 µm or |
| option B: AlOx or SiOx on BOPP film (a4) | 15-25 µm |
| laminating adhesive | 3 g/m$^2$ |
| cPP film (a2) | 30-60 µm |

BOPP (a1)/cPP (a2) Laminate (Monomaterial):

| layers | thickness/coating weight |
| --- | --- |
| ink-receiving layer (b) | 22 g/m² |
| optionally: adhesion promoting layer (a3) | 0.1 g/m² |
| BOPP film (white or transparent) (a1i-1) | 50 µm |
| optionally: adhesion promoting layer | 0.1 g/m² |
| laminating adhesive | 3 g/m² |
| cPP film (a2) | 30-60 µm |

Symmetric Coextruded Film (Monomaterial), e.g. Symmetric Blown Film:

| layers | thickness/coating weight |
| --- | --- |
| ink-receiving layer (b) | 22 g/m² |
| adhesion promoting layer (PP co/terpolymer) (a3) | 0.1 g/m² |
| BOPP core layer (a11) | 20-30 µm |
| optionally: tie layer (a3) | 2-6 µm |
| EVOH polymer layer (a4) | 3-10 µm |
| optionally: tie layer (a3) | 2-6 µm |
| BOPP core layer (a11) | 20-30 µm |
| sealing layer (PP co/terpolymer) (a2) | 10-20 µm |

According to the present invention, the term "pouch" is used interchangeably with the term "bag". The pouch according to the present invention typically has two printable main surfaces. As used herein, the term "main surface" refers to the front or back side of the pouch. The pouch preferably is a flexible pouch. As used herein, the term "flexible pouch" refers to pouches which are not formed from rigid material. Typically, the pouch is closeable, preferably sealable such as by means of heat and/or ultrasound. Preferred pouches according to the present invention are pouches which have an inwardly folded bottom or an inserted bottom which can be made of the unprinted inkjet-printable film or a different polymeric film. The bottom of the pouch is not meant to be a main surface according to the present invention. When folded flat, the pouch preferably has a maximum of 8 film layers, more preferably a maximum of 4 film layers in the bottom area. The bottom area means the part of the flat folded pouch that includes the bottom. The up to 8, preferably 4 film layers can be only layers of the unprinted inkjet-printable film (in case of an inwardly folded bottom or an inserted bottom made of the unprinted inkjet-printable film) or layers of the unprinted inkjet-printable film (such as 2 layers) and also layers (such as 2 layers) of a different polymeric material (in case a different polymeric material is used as the inserted bottom). The maximum thickness of the pouch when folded flat may be in the range of from 200 to 1200 µm, preferably 600 µm, and more preferably to 500 µm.

The pouch according to the present invention may be selected from a stand-up pouch, as for example shown in FIG. 1, a flat bottom bag, flat bottom gusset bag, and a flat bottom side gusset bag. Preferably, the pouch is a stand-up pouch such as a round seal stand-up pouch (Doyen type pouch) or a K-seal stand-up pouch. A stand-up pouch can have an inwardly folded bottom or inserted bottom as described above. The pouch may further comprise one or more optional features selected from a window; reclosable means such as a zipper (including a slider closure with end clip (zip lock) and a press-to-close zipper), a hook-and-loop fastener (velcro closure), and a cold-sealable adhesive strip; a Euro hole; notches such as one or more tear notches; perforations; a thin valve; an opening for spouts or valves. In cases where the pouch comprises reclosable means or a thin valve, the overall thickness of the pouch including the reclosable means or the thin valve is in the range of from 500 to 1500 µm. The overall thickness refers to the thickness of the pouch when the pouch is folded and not filled with any goods. The filling volume of the pouch may range of from 100 ml to 3 l.

In particular, the inventive inkjet-printable pouches according to the present invention are suitable to package of liquids or solids, such as food, pet food, beverages, pharmaceuticals, personal care products, electronic parts, toys, lubricating oil, or gifts, preferably food, pet food, beverages, pharmaceuticals and/or personal care products.

The present invention further relates to a method for producing unprinted inkjet-printable fillable pouches from the unprinted inkjet-printable film on a pouch making machine, comprising the steps of: (m-1) providing one or more web of the unprinted inkjet-printable film which are preferably unwound from one or more reels; (m-2) moving the web(s) of the unprinted inkjet-printable film in a longitudinal direction; (m-3) converting the web(s) of unprinted inkjet-printable film into a pouch precursor web having a desired shape by folding and/or stacking of the web(s) with the ink-receiving layer (b) as outer layers of the pouch precursor web and optionally integrating a bottom; (m-4) sealing the pouch precursor web, preferably by means of heat and/or ultrasound, to obtain a web of pouches (m-5) cutting off the pouches from the web; and (m-6) optionally stacking the pouches.

The pouch produced by the method according to the present invention may be any of the pouches described above. Pouch making machines are commercially available, e.g. from Mamata Machinery Pvt. Ltd, Totani Corporation, and Karlville Development, LLC.

More than one web may be used in the method for producing the pouches. Two webs of the unprinted inkjet-printable film may be fed, e.g. a second web to form the body of the pouch (two faces of the pouch are prepared from two webs) and/or optionally a third web to form an inserted bottom. It is understood that two webs can be provided from one reel by unwinding and dividing the broader web into two narrower webs prior to converting step (m-3). Also, a web of a different material may be provided and typically unwound from a reel, e.g. to form an inserted bottom or a window.

Cutting off the pouches from the web in step (m-5) is to be understood broadly to also encompass punching out the pouch shapes from a broader web and/or trimming the edges of the web. The converting step (m-3) of the method for producing pouches may comprise the integration of a bottom which can be formed from a further web of the unprinted inkjet-printable film or from a web of a different polymeric material. Moreover, one or more of steps (m-3) to (m-5) may comprise the integration of one or more of the optional features described above when referring to the pouch. These features may be integrated into the single pouch shapes of the pouch precursor web individually or in any combination at different stages in the process, as it is practical from a production standpoint. A zipper, for example, can be placed inside the single pouch shape near the future open side opposite of the bottom in converting step (m-3) and sealed in in step (–m-4). Euro holes, notches, and perforations are typically punched in in the cutting step (m-5).

The pouch prepared according to the method of the present invention is fillable either via the thin valve, the opening for spouts or valves, if present, or at least a part of one side of the pouch is open of filling, which is the preferred embodiment. The at least partially open side of the pouch is typically on the opposite side of the bottom and can be obtained advantageously by not or incomplete sealing one side of the pouch precursor in step (m-4) or by cutting off a closed side (which can be folded or sealed) of the pouch in step (m-5).

Figure 2:
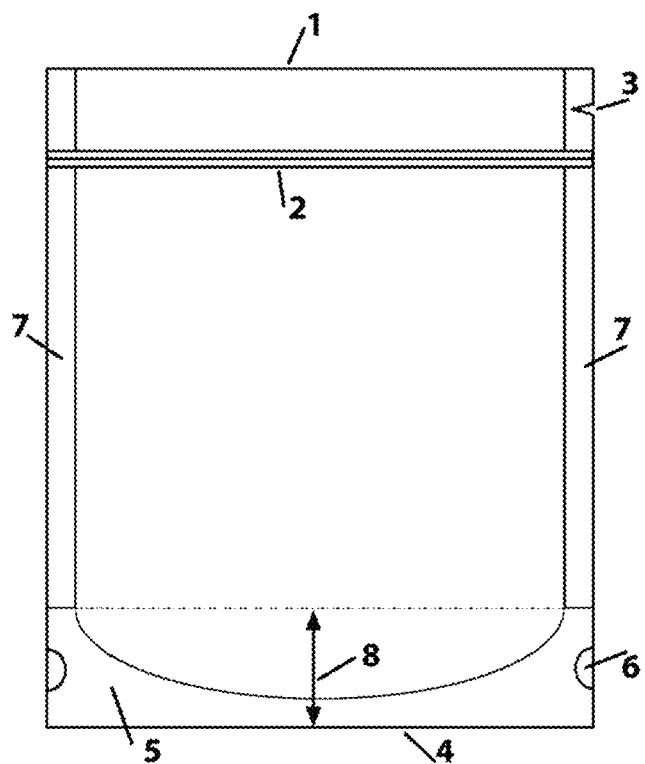
FIG. 2 is a drawing of an inventive stand-up pouch showing the sealing areas.

FIG. 2 is a top view drawing of a flat folded round seal stand-up pouch. The area above the zipper 2 towards the open side 1 of the pouch includes the area for the subsequent sealing of the pouch after it has been filled. This future sealing area will be located above tear notch 3. Opposite the open end 1 of the pouch is the bottom 4 having bottom fold seals 5 (second bottom fold seal on the back side not visible) and two gusset seals 6. The bottom gusset inside the pouch is not visible and has bottom gusset height 8. Side seals 7 are also shown.

In a method for producing the preferred stand-up pouches the converting step (m-3) comprises folding the web into a flat double web form and folding in a gusset for the bottom. For example, the web of the unprinted inkjet-printable film is passed through a set of rakes folding a W-shaped gusset in the bottom 4 so that the future filled pouch can stand. The sealing step (m-4) comprises sealing the folded web in several sealing steps to create side seals 7 in a vertical orientation relative to the longitudinal direction of the web as well as bottom seals. The bottom seals include the seals of the bottom folds (bottom fold seals 5) and seals that hold the gusset together at its ends (gusset seals 6). The gusset seals 6 may join together the gussets ends only partially allowing the spreading of bottom fold seals 7 to enable a more stable stand of the pouch. The gusset seals 6 are often prepared by punching out semicircular areas from the bottom gusset to seal together the inner sealing layers (a2) of the unprinted inkjet-printable film of the faces of the pouch shape in the bottom area. If a zipper has been integrated in step (m-3) it is sealed to the inside of the pouch shape, i.e. to the sealing layer (a2) of the unprinted inkjet-printable film. The cutting step (m-5) comprises cutting off the pouches vertically along a central line through the common side seal area of two adjacent pouches and optionally cutting off excess material at the edges of the web.

According to the present invention, all steps (m-1) to (m-5) and optional stacking step (m-6) are performed inline, i.e., on a single pouch making machine.

The present invention is further directed to a pouch obtainable by the method for producing pouches as described above.

The present invention further relates to a method for printing an unprinted inkjet-printable fillable pouch as described above comprising the step of water-based inkjet printing at least one main surface of the pouch. The printing can be performed as format wide printing or partial printing, preferably as borderless format wide printing. As used herein, the term "format wide printing" refers to printing of the pouch wherein the full surface of one main surface of the pouch is printed. Borderless printing allows to generate a print image without any unprinted margins. The term "partial printing" refers to printing wherein only a part of the main surface, typically the major part, i.e., more than 50%, preferably more than 60% or more than 70% of one main surface of the pouch is printed. As meant herein, the printed surface is a rectangular area surrounding the print image and also including regions within the print image that do not receive ink. Typically, the printing is performed as a single pass inkjet printing process.

The method for printing may comprise the steps of (p-1) feeding the pouch on a conveyor belt, preferably a vacuum conveyor belt, (p-2) transporting the pouch underneath the printing station, and (p-3) water-based inkjet printing one main surface of the pouch.

The feeding (p-1) may be selected from friction feeding and pick and place feeding with robotic arms, such as pick and place feeding with robotic arms using vacuum suction cups. The speed of the conveyor belt is adapted to the printing mode of the inkjet printheads. The method of printing preferably further comprises the step of (p-4) transporting the printed pouch on the conveyor belt through or beneath a lacquering station and over-lacquering or varnishing the printed pouch, preferably wherein the over-lacquering or varnishing is a non-impact lacquering or varnishing method such as spray coating or (digital) inkjet printing, typically with a water-based overprint varnish. In addition, the method of printing preferably further comprises the step of (p-5) transporting the printed pouch on the conveyor belt through or beneath a dryer and drying the printed pouch after the printing step (p-3) and/or the optional lacquering step (p-4). In case when the method is conducted for more than one pouch, the method for printing may further comprise the step of (p-6) stacking the printed pouches.

According to the present invention the method for printing an unprinted inkjet-printable fillable pouch may be performed for one main surface of the pouch or for the first and the second main surface of the pouch. In the latter case, (p-1), (p-2), (p-3) and optional steps (p-4), (p-5) and (p-6) performed for the first main surface, are repeated for the second main surface of the pouch. The method for printing may be performed in such a way that both main surfaces are printed in a single pass of the printing method including turning of the pouch.

Advantageously, the pouches are printed with a digital inkjet printer comprising a single pass printing system and running with high printing speed such as printing speeds from 9, preferably from 15, more preferably from 30 to 100 m/min, i.e. a printing system comprising a stationary printing bar over the width of the conveyor belt whereas the bar comprises the printing heads. Exemplary high speed single pass inkjet printing heads/bars are commercially available from Hewlett Packard, Canon, Epson, Kyocera, Fujifilm Dimatrix, Kyocera, Ricoh, Toshiba, Xaar and Memjet.

The inkjet printing may be full color CMYK printing, full color CMYK printing with additional colors, e.g. blue, green, orange, red, and particularly white or silver, or full color printing with different colors than CMYK. Preferably the inkjet printing is full color CMYK printing.

Any aqueous (=water-based) inkjet ink can be used for printing the pouches. Suitable aqueous inks include both dye-based inks comprising water-soluble dyes and/or dye clusters and pigment-based inks comprising dispersed pigments with pigment-based inks being preferred. Depending on the intended use of the pouches the aqueous ink is preferably safe for use on food packaging, i.e. it does not contain substances which migrate through the layers of the inkjet printable flexible film into a packaged good leading to non-compliant food. Other inks which do not contain substances that migrate through the layers can also be applied to the ink-receiving layer of the pouches if the inkjet printable pouches are not intended for food packaging. Preferably, aqueous pigment-based inks comprising no or only low amounts (total amount of less than 20 weight %, based on the total weight of the ink) of co-solvent respectively humectants, such as glycerol, 1,2-propane diol, 1,3-propane diol, poly(ethylene glycol), and poly(propylene glycol) are used.

One example of printing system suitable in the method according to the present invention is a Memjet DuraFlex CMYK inkjet printing system with DuraFlex printing bar and DuraFlex aqueous pigment printing ink.

The printing method according to the present invention enables the continuous printing of all regions of the main surface of the pouch, including thicker regions of the pouch like a folded bottom or the area in which a zipper is included, even if these regions are directly adjacent to thinner pouch regions.

The present invention further relates to a method for producing a printed pouch, comprising the steps of (1) producing an unprinted inkjet-printable fillable pouch from an unprinted inkjet-printable film according to the method as described above; and (2) printing the pouch according to the method as described above.

Moreover, the present invention is directed to a method for producing a filled printed pouch comprising the steps of (f-1) producing a printed pouch according to the method described above; (f-2) optionally integrating a spout or valve; (f-3) setting-up the printed pouch for filling with goods; (f-4) filling the pouch with goods; and (f-5) sealing the open side of the pouch to close the pouch. As used herein, the term "goods" refers to any product which is suitable for filling into a pouch, typically liquids and solids as described above. The sealing step (f-5) may be provided by means of heat sealing, ultrasonic sealing or a combination of both. Steps (f-2) to (f-5) may be performed in any meaningful sequence according to the requirements of the filling process. Depending on the type of goods to be filled into the pouch, the spout or valve can be integrated into the pouch (step (f-2)) before or after the filling step (f-4). If filling of the pouch through the spout of valve is practical, the sealing step (f-5) can also be performed before the filling step (f-4).

EXAMPLES

Example 1 to 3

Preparation of Aqueous Coating Composition for the Ink-Receiving Layer (b)

6 kg of 25 wt. % of hydrochloric acid and 0.8 kg of boric acid were added to 500 l of water in a 2000 l vessel while stirring. Stirring was continued and 260 kg of boehmite (DISPERAL® HP14, available from Sasol) were added slowly to obtain a dispersion of boehmite particles. 8 kg of a gel type silica (Gasil® HP 270 available from PQ Corporation) having a specific pore volume of 1.8 ml/g and an oil absorption of 280 g/100 g were added to the boehmite dispersion.

In a separate step, the binder solution was prepared by adding 27 kg of poly(vinyl alcohol) having a degree of hydrolysis of from 86.7 to 88.7 mol % and a 4 wt. % aqueous solution viscosity of 38 to 42 m-Pas (Mowiol® 40-88, available from Kuraray) to 200 l of cold water in a 400 l heated vessel while stirring. The suspension was heated to about 90° C. for 1 hour while stirring with a blade agitator until the poly(vinyl alcohol) was dissolved.

The still hot binder solution was slowly poured into the boehmite dispersion under stirring. Cold water was added under stirring in order to adjust the total volume of the aqueous coating composition to 1000 l. It was stirred for further 30 minutes and temperature decreased to about 45° C.

The solid content of the dispersion was about 30.2% by weight with a boehmite to poly(vinyl alcohol) weight ratio of about 9.6:1. The median particle sizes were determined as described before: boehmite $Dv_{50}$=100 nm, gel-type silica $Dv_{50}$=8.7 μm.

Example 1

Preparation of Inkjet Printable Film

The application of the aqueous coating composition to prepare ink-receiving layer (b) was conducted in a roll-to-roll process.

One surface of a 23 μm thick white BOPET film Sarafil® TW102 already coated with a thin polyacrylate coating on one surface was unwind in a coating machine and subjected to a corona treatment on the polyacrylate coated side. The warm aqueous coating composition was applied uniformly to the corona-treated surface of the film using a curtain coating head at a coating speed of 150 m/min to obtain a wet coating weight of about 73 g/m². Afterwards, the coating was dried in a drying oven at up to 100° C. to a dry coating weight of 22 g/m². The resulting microporous ink-receiving layer has a smooth, visually and haptically pleasant surface with a medium gloss and very low stickiness when touched.

In a second step the coated roll is corona treated and then laminated to a 7 μm aluminum foil to the non-inkjet coated side by applying a standard solvent-free 2-component laminating adhesive comprising prepolymer and (poly)isocyanate (LOCTITE LIOFOL LA 7772/LA 6172, available from Henkel). This laminate was stored for 3 days in order to finish the crosslinking of the adhesive.

In a third step this laminate was laminated to a 60 μm LLDPE sealing film on the aluminum side using the same adhesive as described above.

The structure of the inkjet-printable flexible film is as follows:

| layers | thickness/coating weight |
| --- | --- |
| ink-receiving layer (b) | 22 g/m² |
| polyacrylate adhesion promoting layer (a3) | 0.1 g/m² |
| white BOPET film (a1i-1) | 23 μm (incl. polyacrylate) |
| laminating adhesive | 2 g/m² |
| aluminum foil (a4) | 7 μm |
| laminating adhesive | 2 g/m² |
| LLDPE sealing film (a2) | 60 μm |

Preparation of Stand-Up Pouches

The inkjet-printable flexible film was converted to rolls of 440 mm width for the pouch body and 80 mm width for the bottom and 2000 m length. The film reel for the folded pouch body was provided in a width of 440 mm: 200 mm+200 mm+2×20 mm. 2×20 mm extra were needed to print control marks which are cut off later in the pouch making process. The film reel for the bottom was provided separately in a width of 80 mm: 35 mm+35 mm+10 mm. 10 extra mm were needed to print control marks, which are cut off later in the pouch making process.

Stand-up pouches were manufactured from this material using a pouch making machine from Mamata Machinery Pvt. Ltd (type Mamanta Vegaplus 610) by unwinding the two rolls of the film and folding the film web so that the inkjet receiving layers were outside opposite to each other, dividing the folded web to obtain two separate webs, integrating the pouch bottom, integrating a thin zipper and sealing the LLDPE layers at the zipper, at the edges, and at the bottom, followed by stacking the pouches. The stand-up pouches have dimensions of 130 mm×200 mm and a filling volume of 250 ml with one open side with the zipper opposite to the bottom for the later filling with goods. Both main surfaces of the pouches are printable by inkjet printing.
Printing of the Pouches A stack of 100 of the unprinted inkjet-printable pouches were positioned in a friction feeder which was feeding single pouches intermittent from the bottom of the stack to a conveyor belt where the separated pouches are transferred under an inkjet printing unit having a maximum printing width of 324 mm at a printing speed of 27 m/min with a resolution of 1600×1600 dpi in order to print the top side of the printable pouch. The inkjet printing unit was a 4 Color (CMYK) Memjet printhead (ArrowJet OverJet Pro, Arrow Systems Inc.) using aqueous pigmented Memjet's Duraflex inks. The pouches were fed onto the conveyor belt by a friction feeder from the bottom of a stack of max. 100 pouches. The maximum ink load is controlled by the software means in order to avoid oversaturation of the ink jet coating. After printing, the pouches were dried and restacked in an automatic tray system to 100 pieces, now with one side printed.

The printing process was repeated with the 100 pouches positioned in the feeder in the opposite direction (printed surface directed to the conveyor belt).

The printed pouches are ready for filling with goods, optionally closing the open side by the integrated zipper line, sealing the one open side by a heat seal device between the edge and the zipper. The properties of the pouches are shown in Table 1.

Example 2

Instead of 23 μm white BOPET base film as described in Example 1 a 90 μm white BOPP film coextruded with sealing layers and barrier layer based on EVOH (Polifilm Type 2008.TTT.507.w, available from Polifilm Extrusion GmbH, Germany) is used for coating with the ink-receiving coating. The lamination steps with aluminum foil and sealing layer are omitted. The coated film is sealable due to the coextrusion coating on the non-inkjet receptive coating side. The structure of the inkjet-printable flexible film is as follows:

| layers | thickness/coating weight |
|---|---|
| ink-receiving layer (b) | 22 g/m² |
| Coextruded multilayer polymer film (a): | 90 μm |
| PP copolymer layer (a3) | |
| white BOPP homopolymer layer (a1) | |
| tie layer (a3) | |
| EVOH barrier polymer layer (a4) | |
| tie layer (a3) | |
| white BOPP homopolymer layer (a1) | |
| PP copolymer layer (a2) | |

Coating, pouch manufacturing and printing are performed as in Example 1. The properties of the pouches are shown in Table 1.

Example 3

Instead of 23 μm white BOPET base film as described in Example 1 a 23 μm transparent BOPET film with acrylic adhesion coatings on one side Sarafil® S42 and a haze value of 3.0% (ASTM D1003) is used for coating with the ink-receiving coating onto the polyacrylate coated side. The lamination step with aluminum is omitted and a transparent cPP sealing film is laminated onto the non-inkjet receptive coating side.

The structure of the inkjet-printable flexible film is as follows:

| Layers | Thickness/Coating Weight |
|---|---|
| ink-receiving layer (b) | 22 g/m² |
| polyacrylate adhesion promoting layer (a3) | 0.1 g/m² |
| transparent BOPET film (a1i-1) | 23 μm (incl. polyacrylate) |
| laminating adhesive | 2 g/m² |
| transparent cPP sealing film (a2) | 40 μm |

Coating, pouch manufacturing and printing are as in Example 1. The properties of the pouches are shown in Table 1.

Comparative Example

Example 1 was repeated in all parameters except that the 8 kg gel type silica particles Gasil® HP 270 in the aqueous coating composition to prepare ink-receiving layer (b) was replaced with the same amount of the fine boehmite particles of DISPERAL® HP14. The properties of the pouches are shown in Table 1.
Applied Test Methods The thickness of the unprinted inkjet-printable film was determined according to EN ISO 534:2011 in mm.

Rz, Ra, dynamic CoF, gloss, haze, and tear strength of the unprinted inkjet-printable film were determined as described before.

The print performance was rated visually: It was judged for color gamut, color saturation, print sharpness and resolution as well as for artefacts like bleeding, blurring, mottling or coalescence. A rating of 1 to 5 is correlated to the quality of the print: 1=print with very visible artefacts and/or low color gamut, color saturation, print sharpness and resolution to 5=no print artefacts and high color gamut, color saturation, print sharpness and resolution to.

Haptic performance was evaluated by a test person feeling the surface of the pouches. A non-sticky surface is desired for customer satisfaction as well as good machinability. Sticky surfaces often cause problems when feeding the pouches into a machine, such as a printing press.

Table 1

| | Example 1 | Example 2 | Example 3 | Comparative Example |
|---|---|---|---|---|
| Thickness of multilayer polymer film (a) in μm | 94 | 90 | 85 | 95 |
| Thickness of unprinted inkjet-printable film in μm | 116 | 112 | 107 | 117 |
| Rz | 5.47 | 5.30 | 5.52 | 2.44 |
| Ra | 0.763 | 0.771 | 0.750 | 0.248 |

-continued

|  | Example 1 | Example 2 | Example 3 | Comparative Example |
|---|---|---|---|---|
| Dynamic CoF film to film | 0.38 | 0.39 | 0.38 | 0.67 |
| Gloss 60° | 15 | 15 | 15 | 51 |
| Haze in % | n.a. | n.a. | 48 | n.a. |
| Tear resistance in N |  |  |  |  |
| MD | 3.0 | 1.8 | 2.5 | 3.1 |
| CD | 6.4 | 8.8 | 5.3 | 6.2 |
| Pouch manufacturing | Good | Good | Good | Transporting issues and folds; several machine stops |
| Feeding to print belt | Good | Good | Good | Singulation issues from stack of pouches (simultaneous feeding of 2 or more pouches) |
| Print performance | 5 | 5 | 5 | 5 |
| Haptic | Non-sticky | Non-sticky | Non-sticky | Sticky |

It is evident form the experimental data that the inventive inkjet-printable pouches formed from an unprinted inkjet-printable film comprising the specific combination of fine inorganic particles and coarse particles combine excellent machinability on pouch making and printing machines with high-quality printability with water-based inkjet inks, and desired haptic properties.

Aspects of the Invention:

1. An unprinted inkjet-printable fillable pouch made of an unprinted inkjet-printable film comprising:
    (a) a multilayer polymer film comprising a base layer (a1) and a sealing layer (a2) which is the inner layer of the pouch and
    (b) at least one ink-receiving layer as the outer layer deposited on the multilayer polymer film (a) from an aqueous coating composition comprising:
        (b1) a polymeric binder,
        (b2) fine inorganic particles having a median particle size (Dv50) of from 50 to 300 nm, preferably from 65 to 200 nm, and more preferably from 80 nm to 180 nm, as determined by laser diffraction according to ISO 13320:2020-01, and
        (b3) coarse inorganic and/or organic particles having a median particle size (Dv50) of from 5 to 14 μm, preferably from 6 to 13 μm, and more preferably from 7 to 12 μm, as determined by laser diffraction according to ISO 13320:2020-01;
    wherein the unprinted inkjet-printable film has an average surface roughness Rz of from 3.0 to 12.0 μm, preferably from 4.0 to 10.0 μm, as determined on the surface of the ink-receiving layer (b) according to DIN EN ISO 4287:2010-07 with a sampling length ln of 4.0 mm and a single sampling length lr of 0.8 mm as defined in DIN EN ISO 4288:1998-04 with a 2 μm probe tip and an aperiodic profile setting.

2. An unprinted inkjet-printable fillable pouch made of an unprinted inkjet-printable film comprising:
    (a) a multilayer polymer film comprising a base layer (a1) and a sealing layer (a2) which is the inner layer of the pouch and
    (b) at least one ink-receiving layer as the outer layer deposited on the multilayer polymer film (a) from an aqueous coating composition comprising:
        (b1) a polymeric binder,
        (b2) fine inorganic particles having a median particle size (Dv50) of from 50 to 300 nm, preferably from 65 to 200 nm, more preferably from 80 nm to 180 nm, as determined by laser diffraction according to ISO 13320:2020-01, and
        (b3) coarse inorganic and/or organic particles having a median particle size (Dv50) of from 5 to 14 μm, preferably from 6 to 13 μm, more preferably from 7 to 12 μm, as determined by laser diffraction according to ISO 13320:2020-01;
    wherein the coarse inorganic and/or organic particles have a specific pore volume of from 1.3 to 2.5 ml/g, preferably from 1.5 to 2.3 ml/g, more preferably from 1.7 to 2.1 ml/g, as determined according to DIN 66134:1998-02.

3. An unprinted inkjet-printable fillable pouch made of an unprinted inkjet-printable film comprising:
    (a) a multilayer polymer film comprising a base layer (a1) and a sealing layer (a2) which is the inner layer of the pouch and
    (b) at least one ink-receiving layer as the outer layer deposited on the multilayer polymer film (a) from an aqueous coating composition comprising
        (b1) a polymeric binder,
        (b2) fine inorganic particles having a median particle size (Dv50) of from 50 to 300 nm, preferably from 65 to 200 nm, more preferably from 80 nm to 180 nm, as determined by laser diffraction according to ISO 13320:2020-01, and
        (b3) coarse inorganic and/or organic particles having a median particle size (Dv50) of from 5 to 14 μm, preferably from 6 to 13 μm, more preferably from 7 to 12 μm, as determined by laser diffraction according to ISO 13320:2020-01;
    wherein the coarse inorganic and/or organic particles have an oil absorption value of from 220 to 400 g/100 g, preferably from 230 to 380 g/100 g, more preferably from 240 to 360 g/100 g, as determined according to DIN EN ISO 787-5:1995-10.

4. The pouch according to aspects 1 or 2, wherein the coarse inorganic and/or organic particles have an oil absorption value of from 220 to 400 g/100 g, preferably from 230 to 380 g/100 g, more preferably from 240 to 360 g/100 g.

5. The pouch according to aspects 1 or 3, wherein the coarse inorganic and/or organic particles have a specific pore volume of from 1.3 to 2.5 ml/g, preferably from 1.5 to 2.3 ml/g, more preferably from 1.7 to 2.1 ml/g.

6. The pouch according to aspects 2 or 3, wherein the unprinted inkjet-printable film has an average surface roughness Rz of from 3.0 to 12.0 μm, preferably from 4.0 to 10.0 μm.
7. The pouch according to aspect 1, wherein the coarse inorganic and/or organic particles have a specific pore volume of from 1.3 to 2.5 ml/g, preferably from 1.5 to 2.3 ml/g, more preferably from 1.7 to 2.1 ml/g and an oil absorption value of from 220 to 400 g/100 g, preferably from 230 to 380 g/100 g, more preferably from 240 to 360 g/100 g.
8. The pouch according to any of the preceding aspects, wherein the multilayer polymer film (a) is a coextruded polymer film or a laminated polymer film, preferably the multilayer polymer film (a) is a laminated polymer film.
9. The pouch according to any of the preceding aspects, wherein the base layer (a1) is a non-sealable polymer layer (a1i).
10. The pouch according to aspect 9, wherein the non-sealable polymer layer (a1i) is a biaxially oriented polymer film (a1i-1).
11. The pouch according to aspect 10, wherein the biaxially oriented polymer film (a1i-1) comprises a thermoplastic material preferably selected from polyesters, polyolefins, polystyrenes, polyamides, and blends and copolymers thereof, and more preferably selected from poly(ethylene terephthalate)s, poly(ethylene naphthalate)s, polylactides, polypropylenes, polyamides and blends and copolymers thereof.
12. The pouch according to aspect 11, wherein the biaxially oriented polymer film (a1i-1) is a biaxially oriented polypropylene (BOPP) film or a biaxially oriented poly(ethylene terephthalate) (BOPET) film.
13. The pouch according to aspect 9, wherein the non-sealable polymer layer (a1i) is a non-oriented polymer layer (a1i-2).
14. The pouch according to aspect 13, wherein the non-oriented polymer layer (a1i-2) comprises regenerated cellulose or a cellulose acetate, such as cellulose monoacetate, diacetate or triacetate or any combination thereof.
15. The pouch according to any of the preceding aspects, wherein the base layer (a1) has a thickness of from 8 to 80 μm, preferably from 12 to 60 μm.
16. The pouch according to any of the preceding aspects, wherein the sealing layer (a2) is a heat-sealing layer, and/or a layer for ultrasonic sealing, preferably it is a heat-sealing layer.
17. The pouch according to any of the preceding aspects, wherein the sealing layer (a2) is a heat-sealing layer and comprises a not biaxially oriented polyamide (PA); a polyethylene, such as high density polyethylene (HDPE), low density polyethylene (LDPE), linear low density polyethylene (LLDPE), ultra linear low density polyethylene (ULLDPE), or metallocene based LLDPE (mLLDPE); a polyethylene copolymer, such as ethylene (meth)acrylic acid copolymer (EAA), ethylene methyl acrylate (EMA), ethylene-vinyl acetate copolymer (EVA), ethylene butyl acrylate (EBA); a polypropylene, such as cast polypropylene (cPP); a polypropylene copolymer, such as a propylene/ethylene copolymer (including terpolymers); (co)polyesters, such as amorphous poly(ethylene terephthalate) (APET), not biaxially oriented glycol-modified poly(ethylene terephthalate) (PET-G), or not biaxially oriented polylactides (PLA), e.g. cast polylactide (cPLA); poly(vinylidene chloride); poly(vinylchloride); poly(vinyl acetate); a poly(meth)acrylate or any combination thereof.
18. The pouch according to any of the preceding aspects, wherein the sealing layer (a2) is a coextruded polymer film, preferably a coextruded polypropylene/polypropylene copolymer film or a coextruded polyethylen/polyethylene copolymer film, such as a cast or blown coextruded polyethylene/polyethylene copolymer film.
19. The pouch according to any of the preceding aspects, wherein the multilayer polymer film (a) is a laminated polymer film and the sealing layer (a2) has a thickness of from 25 to 120 μm, preferably from 30 to 90 μm.
20. The pouch according to any of aspects 1 to 18, wherein the multilayer polymer film (a) is a coextruded polymer film and the sealing layer (a2) has a thickness of from 8 to 25 μm.
21. The pouch according to any of the preceding aspects, wherein the base layer (a1) and the sealing layer (a2) are a monomaterial, such as a polypropylene or poly(ethylene terephthalate) monomaterial, e.g.
    the base layer (a1) is a BOPP film and the sealing layer (a2) is a cPP film or
    the base layer (a1) is a BOPP film and the sealing layer (a2) is a cast coextruded polypropylene/polypropylene copolymer film or
    the base layer (a1) is a BOPET film and the sealing layer (a2) is an APET or PET-G film.
22. The pouch according to any of the preceding aspects, wherein the multilayer polymer film (a) further comprises at least one intermediate layer (a3), preferably an adhesion promoting layer or a tie layer.
23. The pouch according to aspect 22, wherein the adhesion promoting layer comprises a polymer selected from poly(meth)acrylates, copolymers comprising units derived from (meth)acrylates, poly(vinyl acetate)s, polyurethanes, polypropylene copolymers, such as polypropylene terpolymers, and blends of these polymers.
24. The pouch according to aspects 22 or 23, wherein the intermediate layer (a3) is located on top or below or on both sides of the base layer (a1).
25. The pouch according to any of the preceding aspects, wherein the multilayer polymer film (a) comprises a barrier layer (a4).
26. The pouch according to aspect 25, wherein the barrier layer (a4) is located between the base layer (a1) and the sealing layer (a2).
27. The pouch according to aspects 25 or 26, wherein the barrier layer (a4) is a metal or metal oxide, a metal or metal oxide coated polymeric carrier film, a metal foil or a polymer film having barrier properties, preferably the barrier layer (a4) is a polymer film comprising an ethylene/vinyl alcohol copolymer (EVOH) or a polyamide (co)polymer; an aluminum foil or a copper foil, preferably an aluminum foil.
28. The pouch according to any of aspects 25 to 27, wherein the barrier layer (a4) has a thickness of from 6 to 30 μm, preferably from 7 to 25 μm, and in case it is an aluminum foil, more preferably from 7 to 15 μm.
29. The pouch according to any of the preceding aspects, wherein the base layer (a1) consists of coextruded sublayers comprising two core layers (a11) and a central barrier layer (a4), and optionally intervening tie layers (a3).

30. The pouch according to aspect 29, wherein the multilayer polymer film (a) is a coextruded film, such as a symmetric blown film, preferably comprising the following layers:
adhesion promoting layer (a3) such as a polypropylene copolymer, e.g. a polypropylene terpolymer
core layer (a11) such as a BOPP core layer,
optionally a tie layer (a3),
a barrier layer (a4) such as an EVOH layer,
optionally a tie layer (a3),
core layer (a11) such as a BOPP core layer,
sealing layer (a2) such as a polypropylene copolymer, e.g. a polypropylene terpolymer.

31. The pouch according to any of the preceding aspects, wherein the multilayer polymer film (a) has a thickness of from 35 to 300 µm, preferably from 50 to 140 µm, more preferably from 60 to 120 µm, and most preferably from 70 to 100 µm.

32. The pouch according to any of the preceding aspects, wherein the polymeric binder (b1) is a water-soluble polymeric binder.

33. The pouch according to any of the preceding aspects, wherein the polymeric binder (b1) comprises poly(vinyl alcohol); poly(vinyl alcohol) derivatives; poly(ethylene oxide); poly (vinyl methyl ether); cellulose derivatives, such as methylcellulose, ethylcellulose, and carboxymethylcellulose; polyvinylpyrrolidone; or any combination thereof; preferably poly(vinyl alcohol), poly(vinyl alcohol) derivatives, or any combination thereof.

34. The pouch according to aspect 33, wherein poly(vinyl alcohol) or a derivative thereof is used as the sole polymeric binder (b1) in the ink-receiving layer (b).

35. The pouch according to aspects 33 or 34, wherein the poly(vinyl alcohol) has a degree of hydrolysis of from 80 to 99 mol %, preferably from 86 to 98 mol %.

36. The pouch according to any of aspects 33 to 35, wherein the poly(vinyl alcohol) has a weight average molecular weight of at least 100.000 g/mol, preferably at least 120.000 g/mol, and more preferably at least 150.000 g/mol, as determined by gel permeation chromatography using polystyrene standards combined with static light scattering (absolute method) on re-acetylized specimen.

37. The pouch according to any of the preceding aspects, wherein the aqueous coating composition further comprises a crosslinking agent (b4), preferably selected from boric acid; borates; dialdehydes, such as glyoxal, glyoxylic acid, salts of glyoxylic acid, such as sodium or calcium salts; dihydrazides, such as adipic acid dihydrazide; di- or polyols, such as methylolmelamine; urea glyoxyl resin or urea glyoxal resins; compounds having silanol groups; and any combination thereof.

38. The pouch according to aspect 37, wherein the polymeric binder (b1) is poly(vinyl alcohol) or a derivative thereof and the crosslinking agent (b4) comprises boric acid and/or a borate.

39. The pouch according to aspects 37 or 38, wherein the ink-receiving layer (b) comprises boron in an amount of >0 and less than 60 mg/m$^2$, preferably less than 40 mg/m$^2$, more preferably less than 30 mg/m$^2$, and most preferably less than 20 mg/m$^2$.

40. The pouch according to any of the preceding aspects, wherein the fine inorganic particles (b2) are selected from alumina, such as fumed alumina; aluminum oxide hydroxide, such as boehmite and pseudoboehmite; aluminum hydroxide; cationically surface-modified silica, such as cationically surface-modified fumed silica and cationically surface-modified colloidal silica obtained by a wet chemical process, and any combination thereof, preferably from boehmite, cationically surface-modified fumed silica, fumed alumina, and combinations thereof, more preferably from boehmite and cationically surface-modified fumed silica and combinations thereof, and most preferably the fine inorganic particles (b2) are boehmite.

41. The pouch according to aspect 40, wherein
(i) the fine inorganic particles (b2) are boehmite particles having a BET specific surface area of from 100 to 200 m2/g, preferably from 120 to 180 m2/g, determined by gas adsorption according to ISO 9277:2010 on the powder after calcination at 550° C. for 3 h;
(ii) the fine inorganic particles (b2) are cationically surface-modified fumed silica particles having a BET specific surface area of from 100 to 400 m2/g, preferably from 200 to 300 m2/g, determined by gas adsorption according to ISO 9277:2010 before cationization; and/or
(iii) the fine inorganic particles (b2) are fumed alumina particles having a BET specific surface area of from 50 to 150 m2/g, preferably from 85 to 115 m2/g, determined by gas adsorption according to ISO 9277:2010.

42. The pouch according to aspects 40 or 41, wherein
(i) the fine inorganic particles (b2) are boehmite particles and the weight ratio of boehmite particles to binder (b1) is within the range of from 7:1 to 25:1, preferably from 7.5:1 to 20:1, and more preferably from 8:1 to 12:1;
(ii) the fine inorganic particles (b2) are cationically surface-modified silica particles and the weight ratio of silica particles to binder (b1) is within the range of from 3:1 to 15:1; and/or
(iii) the fine inorganic particles (b2) are alumina particles and the weight ratio of alumina particles to binder (b1) is within the range of from 10:1 to 20:1.

43. The pouch according to any of aspects 40 to 42, wherein the fine inorganic particles (b2) are boehmite particles and the ink-receiving layer (b) has a porosity of from 0.3 to 1.5 ml/g, preferably from 0.35 to 1.2 ml/g, more preferably from 0.4 to 1.0 ml/g, most preferably from 0.5 to 0.8 ml/g, the fine inorganic particles (b2) are cationically surface-modified silica particles and the ink-receiving layer (b) has a porosity of from 0.5 to 2.0 ml/g; and/or the fine inorganic particles (b2) are alumina particles and the ink-receiving layer (b) has a porosity of from 0.2 to 1.2 ml/g.

44. The pouch according to any of aspects 40 to 43, wherein, when the fine inorganic particles (b2) are boehmite particles, the aqueous coating composition further comprises an acidic dispersing agent (b5), preferably an organic and/or inorganic acid having a pk$_a$ value of less than 5.0; more preferably an inorganic acid having a pk$_a$ value of less than 2.0, such as hydrochloric acid.

45. The pouch according to aspect 44, wherein the acidic dispersing agent (b5) is used in an amount of from more than 0 to 10 wt. %, preferably from 1 to 5 wt. %, each based on the amount of the fine inorganic particles (b2).

46. The pouch according to any of the preceding aspects, wherein the coarse particles (b3) are selected from inorganic particles selected from aluminum oxide; aluminum oxide hydroxide, such as boehmite or pseudoboehmite; silica, such as precipitated silica and gel type silica; and any combinations thereof; organic particles selected from polymeric particles, such as dispersible particles comprising a polymer selected from polymers and copolymers of ethylene, propylene, styrene, tetrafluoroethylene, and (meth) acrylates, such as poly(methylmethacrylate) and styrene/methylmethacrylate copolymer, polyamides, polyesters, polymethyl ureas, and starch, such as rice or corn starch, and combinations thereof, and combinations of any of these inorganic and organic particles.

47. The pouch according to aspect 46, wherein the coarse particles (b3) are inorganic particles, preferably gel-type silica particles.
48. The pouch according to any of the preceding aspects, wherein the coarse particles (b3) are spherical particles.
49. The pouch according to any of the preceding aspects, wherein the fine inorganic particles (b2) are boehmite particles and the coarse particles (b2) are gel-type silica particles.
50. The pouch according to any of the preceding aspects, wherein the ink-receiving layer (b) comprises the coarse particles (b3) in a maximum amount of 20 wt. %, preferably in an amount of from 2 to 5 wt. %, based on the total dry weight of the ink-receiving layer.
51. The pouch according to any of the preceding aspects, wherein the multilayer polymer film (a) and the ink-receiving layer (b) are in direct contact with each other.
52. The pouch according to any of the preceding aspects, wherein the ink-receiving layer (b) is coated over the multilayer polymer film (a) at a dry coating weight being in the range of from 10 to 27 $g/m^2$, preferably from 15 to 25 $g/m^2$, and more preferably from 18 to 24 $g/m^2$.
53. The pouch according to any of the preceding aspects, wherein the unprinted inkjet-printable film has an arithmetic average roughness Ra of from 0.5 to 2.0 μm.
54. The pouch according to any of the preceding aspects, wherein the unprinted inkjet-printable film exhibits a dynamic coefficient of friction of the surface of ink-receiving layer (b) to itself (CoF film to film) in the range of from 0.30 to 0.50, determined according to DIN EN ISO 8295:2004-10 but with 1 kg weight at 300 mm/min drawing speed.
55. The pouch according to any of the preceding aspects, wherein the ink-receiving layer (b) is a non-transparent layer.
56. The pouch according to aspect 55, wherein when the multilayer polymer film (a) is a transparent film having a haze value of no more than 5%, the unprinted inkjet-printable film has a haze value of higher than 25%, more preferably at least 30%, and most preferably at least 40%, as determined according to ASTM D1003, Procedure A.
57. The pouch according to any of the preceding aspects, wherein the unprinted inkjet-printable film has a gloss of from 10 to 30 gloss units, as determined on the surface of ink-receiving layer (b) at 60° according to ISO 2813:2014.
58. The pouch according to any of the preceding aspects, wherein the unprinted inkjet-printable film has a tear resistance of at least 1 N in machine direction (MD) and cross direction (CD), preferably at least 1.5 N in MD and at least 2.0 N, more preferably at least 4.0 N in CD, as determined according to ISO 6383-1:2015-12.
59. The pouch according to any of the preceding aspects, wherein the pouch has two printable main surfaces.
60. The pouch according to any of the preceding aspects, wherein the pouch is closeable, preferably sealable such as by means of heat and/or ultrasound.
61. The pouch according to any of the preceding aspects having an inwardly folded bottom or an inserted bottom made of the unprinted inkjet-printable film or a different polymeric film.
62. The pouch according to aspect 61, wherein the pouch when folded flat has a maximum of four film layers in the bottom area.
63. The pouch according to any of the preceding aspects, wherein the maximum thickness of the pouch when folded flat is in the range of from 200 to 600 μm, preferably from 200 to 500 μm.
64. The pouch according to any of the preceding aspects, wherein the pouch is a flexible pouch, preferably selected from the group consisting of a stand-up pouch, a flat bottom bag, flat bottom gusset bag, and a flat bottom side gusset bag.
65. The pouch according to aspect 64, wherein the pouch is a stand-up pouch such as a round seal stand-up pouch (Doyen type pouch) or a K-seal stand-up pouch.
66. The pouch according to any of the preceding aspects, wherein the pouch comprises one or more further features selected from a window, reclosable means such as a zipper (including a slider closure with end clip (zip lock) and a press-to-close zipper), a hook-and-loop fastener (velcro closure), and a cold-sealable adhesive strip; a Euro hole; a tear notch; perforations; a thin valve; and an opening for spouts or valves.
67. The pouch according to aspect 66, wherein the pouch comprises reclosable means or a thin valve and the overall thickness of the pouch including the reclosable means or the thin valve is in the range of from 500 to 1500 μm.
68. The pouch according to any of the preceding aspects, having a filling volume of 100 ml to 3 l.
69. The pouch according to any of the preceding aspects, wherein the pouch is suitable to package of liquids or solids, such as food, pet food, beverages, pharmaceuticals, personal care products, electronic parts, toys, lubricating oil, or gifts, preferably food, pet food, beverages, pharmaceuticals and/or personal care products.
70. A method for producing unprinted inkjet-printable fillable pouches according to any of aspects 1 to 69 from the unprinted inkjet-printable film on a pouch making machine, comprising the steps of:
    (m-1) providing one or more webs of the unprinted inkjet-printable film which are preferably unwound from one or more reels;
    (m-2) moving the web(s) of the unprinted inkjet-printable film in a longitudinal direction;
    (m-3) converting the web(s) of unprinted inkjet-printable film into a pouch precursor web having a desired shape by folding and/or stacking the web(s) with the ink-receiving layer (b) as outer layers of the pouch precursor web and optionally integrating a bottom;
    (m-4) sealing the pouch precursor web, preferably by means of heat and/or ultrasound, to obtain a web of pouches;
    (m-5) cutting off the pouches from the web; and
    (m-6) optionally stacking the pouches.

71. The method according to aspect 70, wherein one or more of steps (m-3) to (m-5) further comprises integrating one or more of the features described in aspect 66 into a single pouch shape of the pouch precursor web.
72. The method according to aspects 70 or 71, wherein the bottom is made from the unprinted inkjet-printable film provided as one of at least two webs of the unprinted inkjet-printable film.
73. The method according to aspects 70 or 71, wherein the bottom is made from a different polymeric material which is provided as a web of the different polymeric material, preferably unwound from a further reel.
74. The method according to any of aspects 70 to 72, wherein the pouches are stand-up pouches, the converting step (m-3) comprises folding the web into a flat double web form and folding in a gusset for the bottom, the sealing step (m-4) comprises sealing the folded web in several sealing steps to create side seals in a vertical orientation relative to the longitudinal direction of the web as well as bottom seals, and the cutting step (m-5) comprises cutting off the pouches vertically along a central line through the common side seal area of two adjacent pouches and optionally cutting off excess material at the edges of the web.
75. A pouch obtainable by the method according to any of aspects 70 to 74.
76. A method for printing an unprinted inkjet-printable fillable pouch according to any of aspects 1 to 69 or 75 comprising the step of water-based inkjet printing at least one main surface of the pouch.
77. The method according to aspect 76 comprising format wide or partial water-based inkjet printing at least one main surface of the pouch, preferably format wide inkjet printing, more preferably format wide borderless inkjet printing.
78. The method according to aspects 76 or 77, wherein the printing is performed by a single pass inkjet printing process, preferably with printing speeds from 9 to 100 m/min.
79. The method according to any of aspects 76 to 78, comprising the steps of:
    (p-1) feeding the pouch on a conveyor belt;
    (p-2) transporting the pouch underneath the printing station; and
    (p-3) water-based inkjet printing one main surface of the pouch.
80. The method according to aspect 79, wherein the feeding (p-1) is selected from friction feeding and pick and place feeding with robotic arms, such as pick and place feeding with robotic arms using vacuum suction cups.
81. The method according to aspects 79 or 80, wherein the conveyor belt is a vacuum conveyor belt.
82. The method according to any of aspects 79 to 81, further comprising the step of (p-4) transporting the printed pouch on the conveyor belt through or beneath a lacquering station and over-lacquering or over-varnishing the printed pouch, preferably wherein the over-lacquering or over-varnishing is a non-impact lacquering or varnishing method such as spray coating or (digital) inkjet printing.
83. The method according to any of aspects 79 to 82, further comprising the step of (p-5) transporting the printed pouch on the conveyor belt through or beneath a dryer and drying the printed pouch after the printing step (p-3) and/or the optional lacquering step (p-4).
84. The method according to any of aspects 79 to 83, further comprising the step of (p-6) stacking the printed pouches, provided that the method is conducted for more than one pouch.
85. The method according to any of aspects 79 to 84, wherein steps (p-1) to (p-3) and optional steps (p-4) to (p-6) are repeated for the second main surface of the pouch.
86. A method for producing a printed pouch, comprising the steps of
    (1) producing an unprinted inkjet-printable fillable pouch from an unprinted inkjet-printable film according to the method of any of aspects 70 to 74 and
    (2) printing the pouch according to the method of any of aspects 76 to 85.
87. A method for producing a filled printed pouch comprising the steps of:
    (f-1) producing a printed pouch according to the method of aspect 86,
    (f-2) optionally integrating a spout or valve;
    (f-3) setting-up the printed pouch for filling with goods;
    (f-4) filling the printed pouch with goods; and
    (f-5) sealing the open side of the printed pouch to close the pouch.
88. The method according to aspect 87, wherein the sealing step (f-5) is provided by means of heat, and/or ultrasound.

The invention claimed is:
1. An unprinted inkjet-printable fillable pouch made of an unprinted inkjet-printable film comprising:
    (a) a multilayer polymer film comprising a base layer (a1) and a sealing layer (a2), which is the inner layer of the pouch; and
    (b) at least one ink-receiving layer as the outer layer deposited on the multilayer polymer film (a) from an aqueous coating composition comprising:
        (b1) a polymeric binder;
        (b2) fine inorganic particles having a median particle size (Dv50) of from 50 to 300 nm, as determined by laser diffraction according to ISO 13320:2020-01; and
        (b3) coarse inorganic and/or organic particles having a median particle size (Dv50) of from 5 to 14 µm, as determined by laser diffraction according to ISO 13320:2020-01,
    wherein the unprinted inkjet-printable film has an average surface roughness Rz of from 3.0 to 12.0 µm, as determined on the surface of the ink-receiving layer (b) according to DIN EN ISO 4287:2010-07 with a sampling length ln of 4.0 mm and a single sampling length lr of 0.8 mm as defined in DIN EN ISO 4288:1998-04 with a 2 µm probe tip and an aperiodic profile setting.
2. An unprinted inkjet-printable fillable pouch made of an unprinted inkjet-printable film comprising:
    (a) a multilayer polymer film comprising a base layer (a1) and a sealing layer (a2), which is the inner layer of the pouch; and
    (b) at least one ink-receiving layer as the outer layer deposited on the multilayer polymer film (a) from an aqueous coating composition comprising:
        (b1) a polymeric binder;
        (b2) fine inorganic particles having a median particle size (Dv50) of from 50 to 300 nm, as determined by laser diffraction according to ISO 13320:2020-01; and

(b3) coarse inorganic and/or organic particles having a median particle size (Dv50) of from 5 to 14 µm, as determined by laser diffraction according to ISO 13320:2020-01, wherein the coarse inorganic and/or organic particles have a specific pore volume of from 1.3 to 2.5 ml/g, as determined according to DIN 66134:1998-02, and/or an oil absorption value of from 220 to 400 g/100 g, as determined according to DIN EN ISO 787-5:1995-10.

3. The pouch according to claim 1, wherein the base layer (a1) is a non-sealable polymer layer (a1i).

4. The pouch according to claim 1, wherein the base layer (a1) and the sealing layer (a2) are a monomaterial.

5. The pouch according to claim 1, wherein the multilayer polymer film (a) further comprises at least one intermediate layer (a3), and/or a barrier layer (a4).

6. The pouch according to claim 1, wherein the multilayer polymer film (a) has a thickness of from 35 to 300 µm.

7. The pouch according to claim 1, wherein the polymeric binder (b1) is a water-soluble polymeric binder.

8. The pouch according to claim 1, wherein the fine inorganic particles (b2) are selected from alumina, aluminum oxide hydroxide, aluminum hydroxide, cationically surface-modified silica, and any combinations thereof.

9. The pouch according to claim 1, wherein the coarse particles (b3) are selected from:
inorganic particles selected from aluminum oxide, aluminum oxide hydroxide, silica, and any combinations thereof;
organic particles selected from polymeric particles, and combinations of any of these inorganic and organic particles.

10. The pouch according to claim 1, wherein the coarse particles (b3) are spherical particles and/or wherein the coarse particles (b3) are comprised in the ink-receiving layer (b) in a maximum amount of 20 wt. %, based on the total dry weight of the ink-receiving layer.

11. The pouch according to claim 1, wherein the ink-receiving layer (b) is coated over the multilayer polymer film (a) at a dry coating weight being in the range of from 10 to 27 g/m².

12. The pouch according to claim 1, wherein the unprinted inkjet-printable film exhibits a dynamic coefficient of friction of the surface of ink-receiving layer (b) to itself (CoF film to film) in the range of from 0.30 to 0.50, determined according to DIN EN ISO 8295:2004-10 but with 1 kg weight at 300 mm/min drawing speed and/or the unprinted inkjet-printable film has a gloss of from 10 to 30 gloss units, as determined on the surface of ink-receiving layer (b) at 60° according to ISO 2813:2014, and/or the unprinted inkjet-printable film has a tear resistance of at least 1 N in machine direction (MD) and cross direction (CD), as determined according to ISO 6383-1:2015-12, and/or wherein when the multilayer polymer film (a) is a transparent film having a haze value of no more than 5%, the unprinted inkjet-printable film has a haze value of higher than 25%, as determined according to ASTM D1003, Procedure A.

13. The pouch according to claim 1, wherein the pouch is a flexible pouch.

14. A method for producing unprinted inkjet-printable fillable pouches according to claim 1 from the unprinted inkjet-printable film on a pouch making machine, comprising the steps of:
(m-1) providing one or more webs of the unprinted inkjet-printable film which are preferably unwound from one or more reels;
(m-2) moving the web(s) of the unprinted inkjet-printable film in a longitudinal direction;
(m-3) converting the web(s) of unprinted inkjet-printable film into a pouch precursor web having a desired shape by folding and/or stacking the web(s) with the ink-receiving layer (b) as outer layers of the pouch precursor web;
(m-4) sealing the pouch precursor web to obtain a web of pouches;
(m-5) cutting off the pouches from the web; and
(m-6) optionally stacking the pouches,
wherein one or more of steps (m-3) to (m-5) further optionally comprises integrating one or more features selected from a window, a reclosable means, a Euro hole, a tear notch, perforations, a thin valve, and an opening for spouts or valves into a single pouch shape of the pouch precursor web.

15. A method for printing an unprinted inkjet-printable fillable pouch according to claim 1 comprising the step of water-based inkjet printing at least one main surface of the pouch.

16. The method according to claim 15, comprising the steps of:
(p-1) feeding the pouch on a conveyor belt;
(p-2) transporting the pouch underneath the printing station; and
(p-3) water-based inkjet printing one main surface of the pouch, and
(p-4) optionally transporting the printed pouch on the conveyor belt through or beneath a lacquering station and over-lacquering or over-varnishing the printed pouch; and/or
(p-5) optionally transporting the printed pouch on the conveyor belt through or beneath a dryer and drying the printed pouch after the printing step (p-3) and/or the optional lacquering step (p-4) and/or
(p-6) optionally stacking the printed pouches, provided that the method is conducted for more than one pouch.

17. A method for producing unprinted inkjet-printable fillable pouches according to claim 2 from the unprinted inkjet-printable film on a pouch making machine, comprising the steps of:
(m-1) providing one or more webs of the unprinted inkjet-printable film which are preferably unwound from one or more reels;
(m-2) moving the web(s) of the unprinted inkjet-printable film in a longitudinal direction;
(m-3) converting the web(s) of unprinted inkjet-printable film into a pouch precursor web having a desired shape by folding and/or stacking the web(s) with the ink-receiving layer (b) as outer layers of the pouch precursor web;
(m-4) sealing the pouch precursor web to obtain a web of pouches; and
(m-5) cutting off the pouches from the web; and
(m-6) optionally stacking the pouches,
wherein one or more of steps (m-3) to (m-5) further optionally comprises integrating one or more features selected from a window, a reclosable means, a Euro hole, a tear notch, perforations, a thin valve, and an opening for spouts or valves into a single pouch shape of the pouch precursor web.

18. A method for printing an unprinted inkjet-printable fillable pouch according to claim 2, the method comprising the step of water-based inkjet printing at least one main surface of the pouch.

19. The method according to claim 18, comprising the steps of:
- (p-1) feeding the pouch on a conveyor belt;
- (p-2) transporting the pouch underneath the printing station; and
- (p-3) water-based inkjet printing one main surface of the pouch, and
- (p-4) optionally transporting the printed pouch on the conveyor belt through or beneath a lacquering station and over-lacquering or over-varnishing the printed pouch; and/or
- (p-5) optionally transporting the printed pouch on the conveyor belt through or beneath a dryer and drying the printed pouch after the printing step (p-3) and/or the optional lacquering step (p-4) and/or
- (p-6) optionally stacking the printed pouches, provided that the method is conducted for more than one pouch.

\* \* \* \* \*